(12) United States Patent
Kobayashi et al.

(10) Patent No.: US 10,775,733 B2
(45) Date of Patent: Sep. 15, 2020

(54) HOLDING MECHANISM AND IMAGE FORMING APPARATUS

(71) Applicant: CANON KABUSHIKI KAISHA, Tokyo (JP)

(72) Inventors: Takahiro Kobayashi, Nagareyama (JP); Takashi Yahagi, Moriya (JP); Tomoo Akaba, Toride (JP); Yoshiharu Irei, Fujisawa (JP); Shoji Sasaki, Yokohama (JP); Makoto Nishino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/697,743

(22) Filed: Nov. 27, 2019

(65) Prior Publication Data

US 2020/0096932 A1    Mar. 26, 2020

Related U.S. Application Data

(63) Continuation of application No. PCT/JP2018/020036, filed on May 24, 2018.

(30) Foreign Application Priority Data

May 31, 2017 (JP) ................................. 2017-107953

(51) Int. Cl.
*G03G 15/08* (2006.01)
*G03G 21/16* (2006.01)
(52) U.S. Cl.
CPC ..... *G03G 21/1619* (2013.01); *G03G 15/0865* (2013.01)
(58) Field of Classification Search
CPC ........... G03G 15/0865; G03G 15/0872; G03G 15/0886; G03G 15/0875
See application file for complete search history.

(56) References Cited

U.S. PATENT DOCUMENTS 5,570,159 A     10/1996  Hirose et al.
2001/0026707 A1*  10/2001  Miyabe .................. G03G 15/09
                                                                  399/111

(Continued)

FOREIGN PATENT DOCUMENTS

JP      H08-6342 A      1/1996
JP      2008-116619 A   5/2008

(Continued)

OTHER PUBLICATIONS

International Preliminary Report on Patentability dated Dec. 3, 2019, in corresponding PCT Application No. PCT/JP2018/020036.

(Continued)

*Primary Examiner* — Walter L Lindsay, Jr.
*Assistant Examiner* — Jessica L Eley
(74) *Attorney, Agent, or Firm* — Venable LLP

(57) ABSTRACT

A holding mechanism to be used in an image forming apparatus includes a first metal plate provided with a through-hole communicating a first side and a second side, and a second metal plate including a first protruding portion, a second protruding portion, and a third protruding portion being inserted into the through-hole from the first side of the first metal plate, a rim of the through-hole being provided with a first end face and a second end face for regulating movement of the second metal plate in a direction orthogonal to an insertion direction and a through-thickness direction, regulation portions for regulating movement of the second metal plate in the through-thickness direction, and a slope which elastically deforms the first protruding portion to rotate the first protruding portion with the insertion direction as a rotation axis to engage an engagement portion with the second side of the first metal plate.

20 Claims, 9 Drawing Sheets

(56) References Cited

U.S. PATENT DOCUMENTS

2014/0086642 A1\* 3/2014 Itabashi ............. G03G 21/1821
    399/284
2015/0143676 A1\* 5/2015 Kanayama ........... B21D 39/032
    24/697.2

FOREIGN PATENT DOCUMENTS

| JP | 2014-095450 A | 5/2014 |
| JP | 2014-095844 A | 5/2014 |
| JP | 2015-100843 A | 6/2015 |

OTHER PUBLICATIONS

International Search Report and Written Opinion in International Application No. PCT/JP2018/020036 dated Jul. 3, 2018.

\* cited by examiner

HOLDING MECHANISM AND IMAGE FORMING APPARATUS

CROSS-REFERENCE TO RELATED APPLICATIONS

This application is a Continuation of International Patent Application No. PCT/JP2018/020036, filed May 24, 2018, which claims the benefit of Japanese Patent Application No. 2017-107953, filed May 31, 2017, both of which are hereby incorporated by reference herein in their entirety.

BACKGROUND OF THE INVENTION

Field of the Invention

The present invention relates to a holding mechanism that is used in an image forming apparatus, and has one metal plate holding the other metal plate, and an image forming apparatus including the holding mechanism.

Description of the Related Art

An art of positioning a metal plate (component), and an art of simultaneously performing positioning and holding have been conventionally disclosed. For example, a positioning holding mechanism is known, in which when an insertion portion of a second metal plate is inserted into a through-hole of a first metal plate, the insertion portion is held by three protrusions that are provided in the through-hole (Japanese Patent Application Laid-Open No. 2008-116619).

However, even when the insertion portion of the second metal plate is inserted into the through-hole of the first metal plate and the second metal plate is positioned in a plane direction of the first metal plate in the positioning holding mechanism of Japanese Patent Application Laid-Open No. 2008-116619, the insertion portion of the second metal plate may be easily removed from the through-hole of the first metal plate. Further, when the second metal plate is fixed to the first metal plate by welding after the second metal plate is positioned to the first metal plate, by the positioning holding mechanism, the second metal plate may be fixed to the first metal plate with the position of the second metal plate deviated from a predetermined position.

Thus, the present invention provides a holding mechanism in which one metal plate can hold the other metal plate without a protruding portion of a second metal plate easily removing from a through-hole of a first metal plate.

SUMMARY OF THE INVENTION

In order to solve the above described problem, a holding mechanism to be used in an image forming apparatus according to one embodiment of the present invention includes:

a first metal plate in which a through-hole which communicates a first side and a second side which is a back side of the first side is formed; and a second metal plate including a body portion, which is a metal plate having a third side and a fourth side which is a back side of the third side, a first protruding portion, a second protruding portion, and a third protruding portion, the first, second, and third protruding portions being in sheet shapes, formed integrally with the body portion, protruded from the body portion in a plane direction of the body portion, and inserted into the through-hole from a side of the first side of the first metal plate, wherein the first protruding portion protrudes from the body portion between the second protruding portion and the third protruding portion, wherein a rim of the through-hole includes:
  a first end face which faces an end face of the second protruding portion in a direction orthogonal to an insertion direction and a through-thickness direction of the second metal plate, and regulates movement of the second metal plate in the orthogonal direction;
  a second end face which is at an opposite side to the first end face in the orthogonal direction, faces an end face of the third protruding portion in the orthogonal direction, and regulates movement of the second metal plate in the orthogonal direction,
  regulation portions which respectively face the third side and the fourth side of the second protruding portion and the third protruding portion in order to regulate movement of the second metal plate, which is inserted into the through-hole, in the through-thickness direction; and
  a slope which elastically deforms the first protruding portion so that the first protruding portion rotates with an insertion direction of the first protruding portion as a rotation axis in a state in which movement in the orthogonal direction and the through-thickness direction is regulated by the first end face, the second end face and the regulation portions, when the first protruding portion, the second protruding portion and the third protruding portion are inserted into the through-hole, and wherein the first protruding portion includes an engagement portion which engages with the second side of the first metal plate in a state in which the first protruding portion rides over the slope and the elastic deformation is released.

Further features of the present invention will become apparent from the following description of exemplary embodiments with reference to the attached drawings.

DESCRIPTION OF THE EMBODIMENTS

Embodiments of the present invention will be described based on the drawings below. Note that sizes, materials, shapes, relative dispositions and the like of components described in the following embodiments should be arbitrarily changed according to a configuration of an apparatus to which the present invention is applied and various conditions, and the scope of the present invention does not intend to be limited only to the sizes, materials, shapes, relative dispositions and the like of the components described in the following embodiments.

Embodiment 1

(Image Forming Apparatus)

Figure 1:
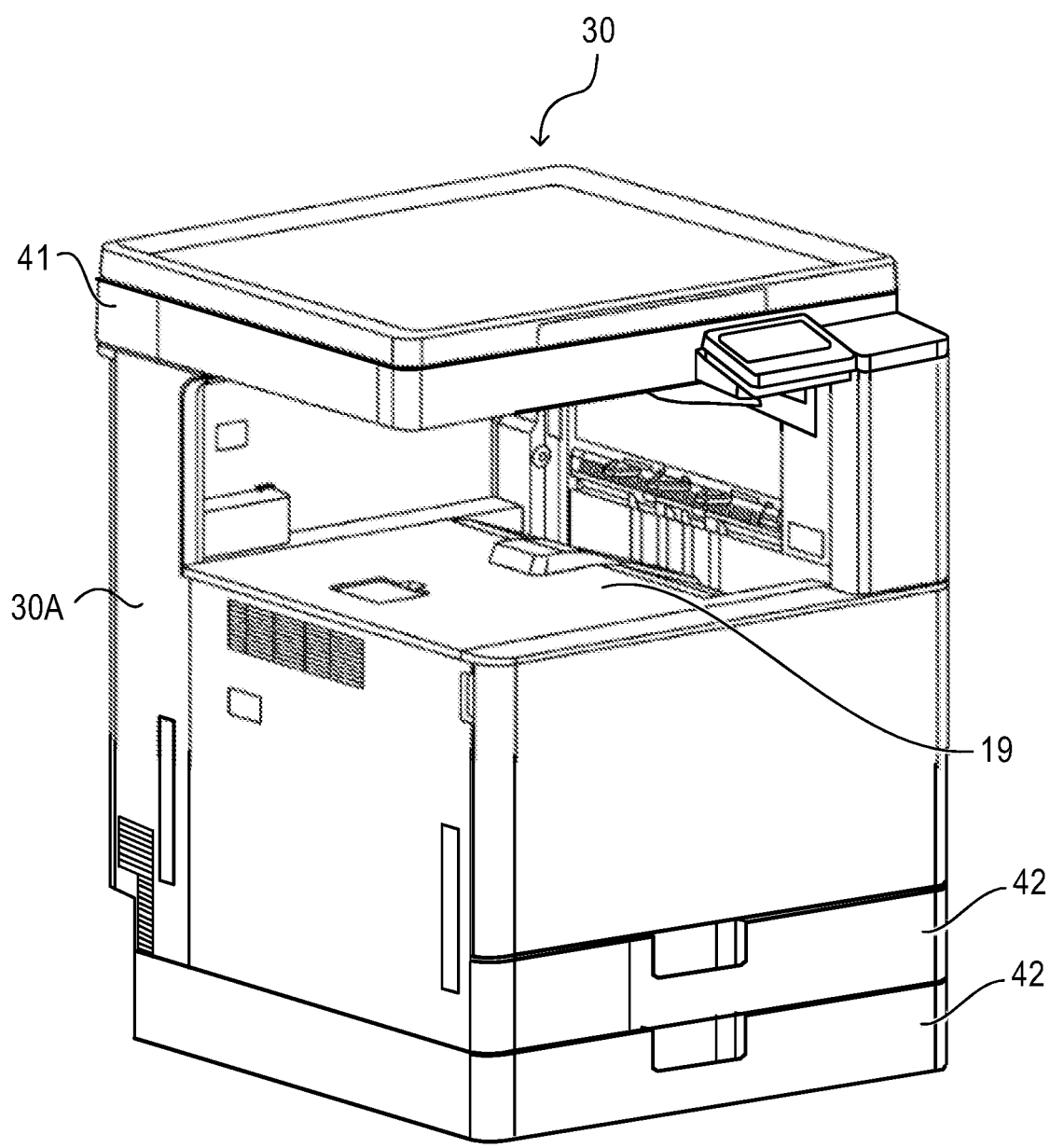
FIG. 1 is a perspective view of an image forming apparatus of Embodiment 1.
Figure 2:
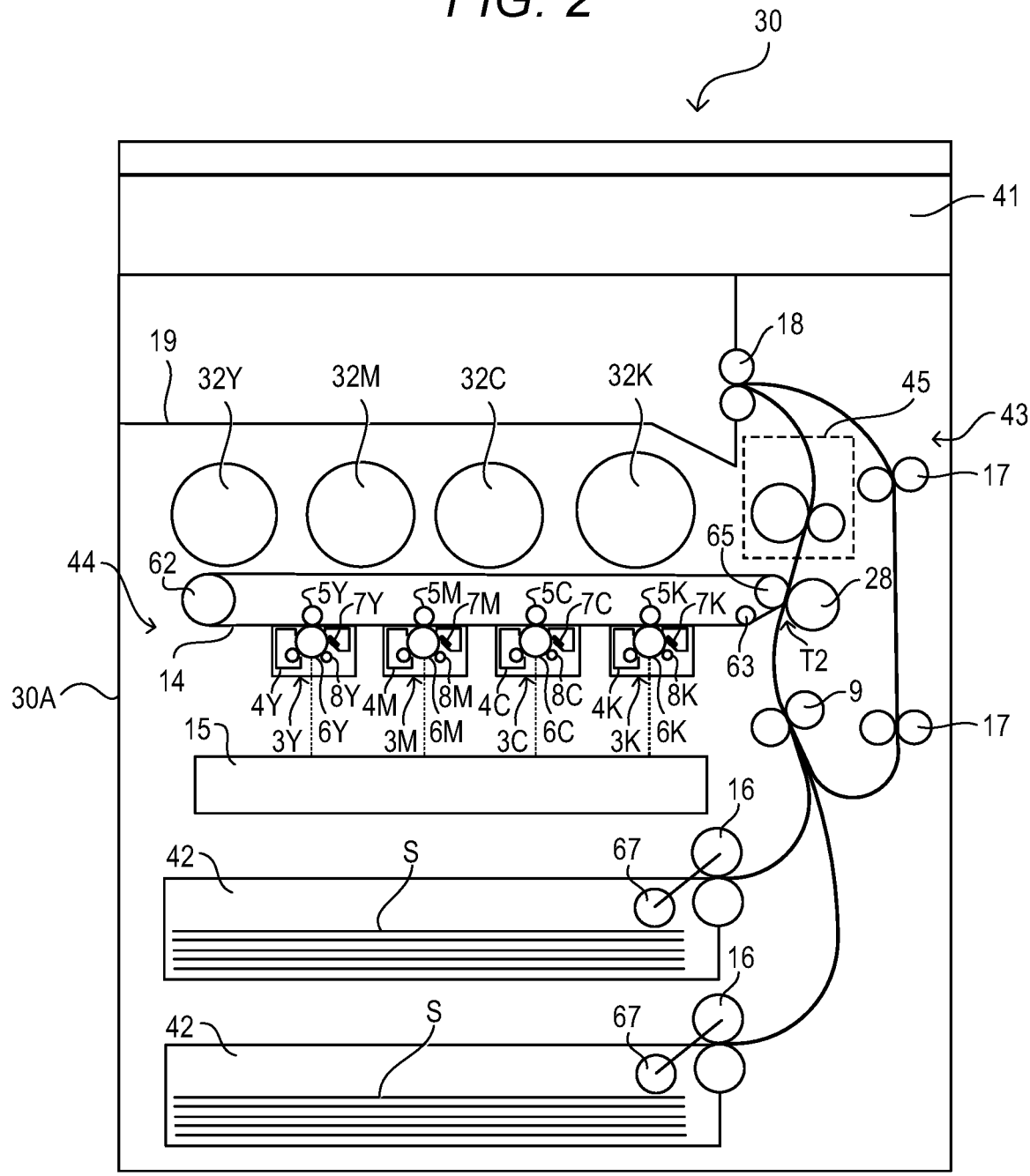
FIG. 2 is a sectional view of the image forming apparatus of Embodiment 1.

FIG. 1 is a perspective view of an image forming apparatus 30 of Embodiment 1. FIG. 2 is a sectional view of the image forming apparatus 30 of Embodiment 1. The image forming apparatus 30 is a full color multifunction machine provided with an image reading portion 41. As illustrated in FIG. 2, the image forming apparatus 30 is of a tandem type in which process cartridges (hereinafter, referred to as cartridges) 3Y, 3M, 3C and 3K are disposed along an intermediate transfer belt 14. The image forming apparatus 30 is an electrophotography image forming apparatus that forms an image on a recording medium S by using an electrophotography method, but is not limited to this. The image forming apparatus 30 may be a copying machine, a facsimile, a laser printer or an ink jet printer. The recording medium S is a transfer material on which an image is formed by the image forming apparatus 30, and is, for example, paper, an OHP sheet, or cloth. Hereinafter, the recording medium S will be referred to as the sheet S. The image forming apparatus 30 has the image reading portion 41, a feeding cassette 42, a sheet conveyance portion 43, an image forming portion 44, and a fixing portion 45.

The image forming portion 44 has the four cartridges 3Y, 3M, 3C and 3K. The cartridges 3Y, 3M, 3C and 3K are mounted to a body 30A of the image forming apparatus 30 to be attachably and detachably. The cartridge 3Y forms a yellow image by using a yellow toner. The cartridge 3M forms a magenta image by using a magenta toner. The cartridge 3C forms a cyan image by using a cyan toner. The cartridge 3K forms a black image by using a black toner. Appended letters Y, M, C, and K of reference signs respectively indicate yellow, magenta, cyan, and black. In the following explanation, the appended letters Y, M, C, and K of the reference signs may be omitted if the appended letters are not particularly necessary. The four cartridges 3 have same structures except for colors of developers (toners).

The cartridge 3 has a photosensitive drum 6 as a photoconductor. A charging apparatus 8, an exposure apparatus 15, a developing apparatus 4, a primary transfer member 5, and a cleaning apparatus 7 are disposed around the photosensitive drum 6. The photosensitive drum 6, the charging apparatus 8, the developing apparatus 4, and the cleaning apparatus 7 integrally form the cartridge 3. On an upper side of the photosensitive drum 6, an intermediate transfer belt (intermediate transfer body) 14 in an endless shape is disposed to contact the photosensitive drum 6. Above the intermediate transfer belt 14, a toner bottle 32 that is a toner storage container that stores tonner as a developer is disposed. The toner bottle 32 is mounted to the body 30A of the image forming apparatus 30 attachably and detachably. The toner bottle 32 supplies toner to the developing apparatus 4.

The intermediate transfer belt 14 is laid on a drive roller 62, and two driven rollers 63 and 65 in a tensioned state. The primary transfer member 5 is disposed to face the photosensitive drum 6 via the intermediate transfer belt 14. The primary transfer member 5 transfers a toner image on the photosensitive drum 6 onto the intermediate transfer belt 14. A secondary transfer roller (secondary transfer member) 28 is disposed to face the driven roller 65 via the intermediate transfer belt 14, and forms a secondary transfer portion T2.

In a lower part of the image forming apparatus 30, the feeding cassettes 42 storing the sheets S are disposed. The feeding cassette 42 is mounted to the body 30A of the image forming apparatus 30 to be capable of being drawn to a front side. The sheets S are fed from the feeding cassette 42 one by one by a pickup roller 67 and a feeding roller 16. The sheet S is conveyed to the secondary transfer portion T2 by a registration roller 9. The fixing portion 45 is disposed at a downstream side of the secondary transfer roller 28 in a conveying direction of the sheet S. The fixing portion 45 is provided in the sheet conveyance portion 43 in a vertical direction. The sheet conveyance portion 43 includes the feeding roller 16, the registration roller 9, the secondary transfer roller 28, the fixing portion 45, a discharge roller 18, and an inversion conveyance roller 17. The sheet S is conveyed upward in the vertical direction to the discharge roller 18 via the fixing portion 45 from the secondary transfer roller 28 in the sheet conveyance portion 43. At a downstream side of the fixing portion 45 in the conveying direction of the sheet S, a discharge tray 19 on which the sheets S where images are formed are stacked is provided. The sheet S is discharged onto the discharge tray 19 by the discharge roller 18.

(Image Formation Process)

Next, an image formation process of the image forming apparatus 30 will be described. Image formation processes in the four cartridges 3 are the same, so that an image formation process in the cartridge 3Y of yellow will be described. Explanation of image formation processes in the cartridge 3M of magenta, the cartridge 3C of cyan, and the cartridge 3K of black are omitted.

The charging apparatus 8Y uniformly charges a front side of the photosensitive drum 6Y The exposure apparatus 15 emits a light beam that is modulated according to image information of a yellow component to the front side of the photosensitive drum 6Y which is uniformly charged, and forms an electrostatic latent image on the photosensitive drum 6Y. The developing apparatus 4Y develops the electrostatic latent image by the yellow toner (developer) that is supplied from the tonner bottle 32Y and makes a yellow toner image. A primary transfer bias is applied to the primary transfer member 5Y from an electric substrate (not illustrated). The primary transfer member 5Y primarily transfers the yellow toner image on the photosensitive drum 6Y onto the intermediate transfer belt 14. The tonner left on the photosensitive drum 6Y after the primary transfer is removed by the cleaning apparatus 7Y.

Likewise, a magenta toner image formed by the cartridge 3M of magenta is superimposed onto the yellow toner image on the intermediate transfer belt 14 with high precision and is transferred on the intermediate transfer belt 14. Thereafter, a cyan toner image and a black tonner image are sequentially superimposed and transferred onto the magenta toner image on the intermediate transfer belt 14. As a result, the toner images of four colors are superimposed on the intermediate transfer belt 14.

The sheets S that are stored in the feeding cassette 42 are fed to the registration roller 9 one by one by the pickup roller 67 and the feeding roller 16. The sheet S is conveyed to the secondary transfer portion T2 in synchronization with the toner images on the intermediate transfer belt 14 by the registration roller 9. The toner images on the intermediate transfer belt 14 are secondarily transferred onto the sheet S collectively by the secondary transfer roller 28. The sheet S on which the toner images are transferred are conveyed to the fixing portion 45. The fixing portion 45 heats and pressurizes the sheet S to fix the toner images on the sheet S. Thereby, the toners of the four colors are melted and mixed and a full-color image is formed on the sheet S. The sheet S on which the image is formed is discharged to the discharge tray 19 by the discharge roller 18.

The sheet conveyance portion 43 includes an inversion unit that performs inversion of the sheet S when images are formed on both sides of the sheet S. The inversion unit includes the inversion conveyance roller 17. When images are formed on both sides of the sheet S, the discharge roller 18 inverts during discharge of the sheet S, and conveys the sheet S to the inversion conveyance roller 17. The inverted sheet S is conveyed to the secondary transfer portion T2 again by the inversion conveyance roller 17. The tonner images are transferred to a back side of the sheet S in the secondary transfer portion T2, and the toner images are fixed to the sheet S by the fixing portion 45. The sheet S on which the images are formed on both the sides is discharged to the discharge tray 19 by the discharge roller 18.

(Frame Body)

Figure 3:
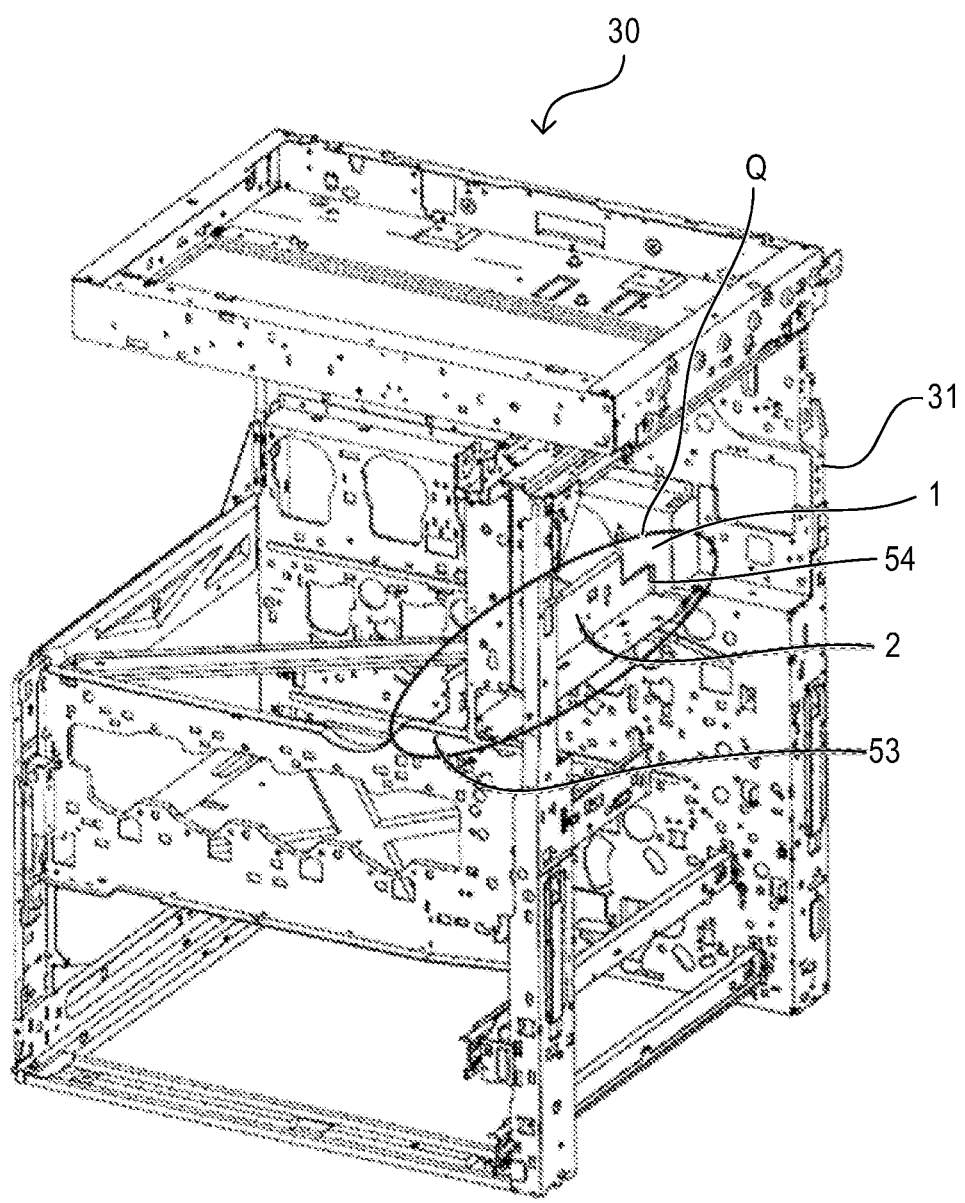
FIG. 3 is a perspective view of a frame body of the image forming apparatus of Embodiment 1.

FIG. 3 is a perspective view of a frame body 31 of the image forming apparatus 30 of Embodiment 1. The frame body 31 is assembled by a plurality of components. The frame body 31 forms the body 30A of the image forming apparatus 30. The frame body 31 has a rear side metal plate (hereinafter, referred to as a first metal plate) 1, a front side metal plate (hereinafter, referred to as a third metal plate) 53 and a support metal plate (hereinafter, referred to as a second metal plate) 2 that connects the first metal plate 1 and the third metal plate 53. The image forming apparatus 30 is assembled by using a positioning holding mechanism 33 that will be described later. By using the positioning holding mechanism 33, one metal plate holds the other metal plate. At the time of assembly of the frame body 31, a connection portion 54 of the first metal plate 1 and the second metal plate 2 is temporarily fixed by the positioning holding mechanism 33. The first metal plate 1 and the second metal plate 2 which are positioned (temporarily fixed) by the connection portion 54 are fixed by laser welding. The second metal plate 2 and the third metal plate 53 are also fixed by laser welding after the second metal plate 2 and the third metal plate 53 are positioned (temporarily fixed) by the positioning holding mechanism 33 that will be described later. In the present embodiment, the second metal plate 2 that is provided in a part enclosed by an oval Q in FIG. 3 is mainly described, but the present embodiment is also applicable to positioning of other components that form the frame body 31. Note that the first metal plate 1 and the second metal plate 2 may be fastened by a screw instead of laser welding. Likewise, the second metal plate 2 and the third metal plate 53 may be fastened by a screw instead of laser welding. In the present embodiment, the first metal plate 1, the second metal plate 2 and the third metal plate 53 are metal members, but may be resin members, for example, without being limited to metal members.

(Holding Mechanism)

Figure 5:
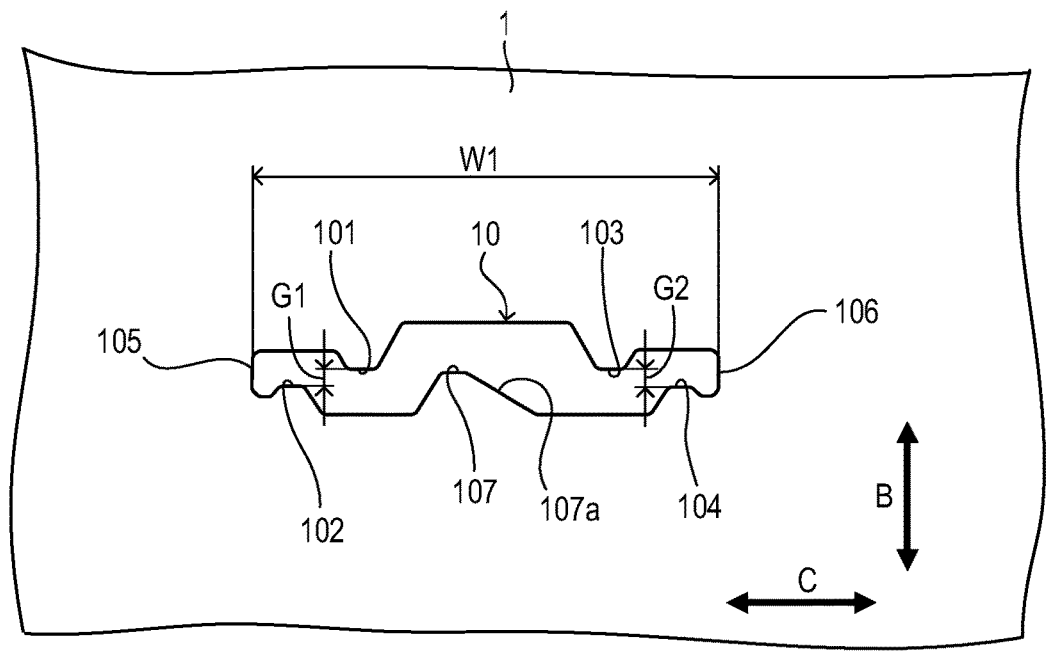
FIG. 5 is a view illustrating a shape of a through-hole that is provided in a first metal plate of Embodiment 1.
Figure 6:
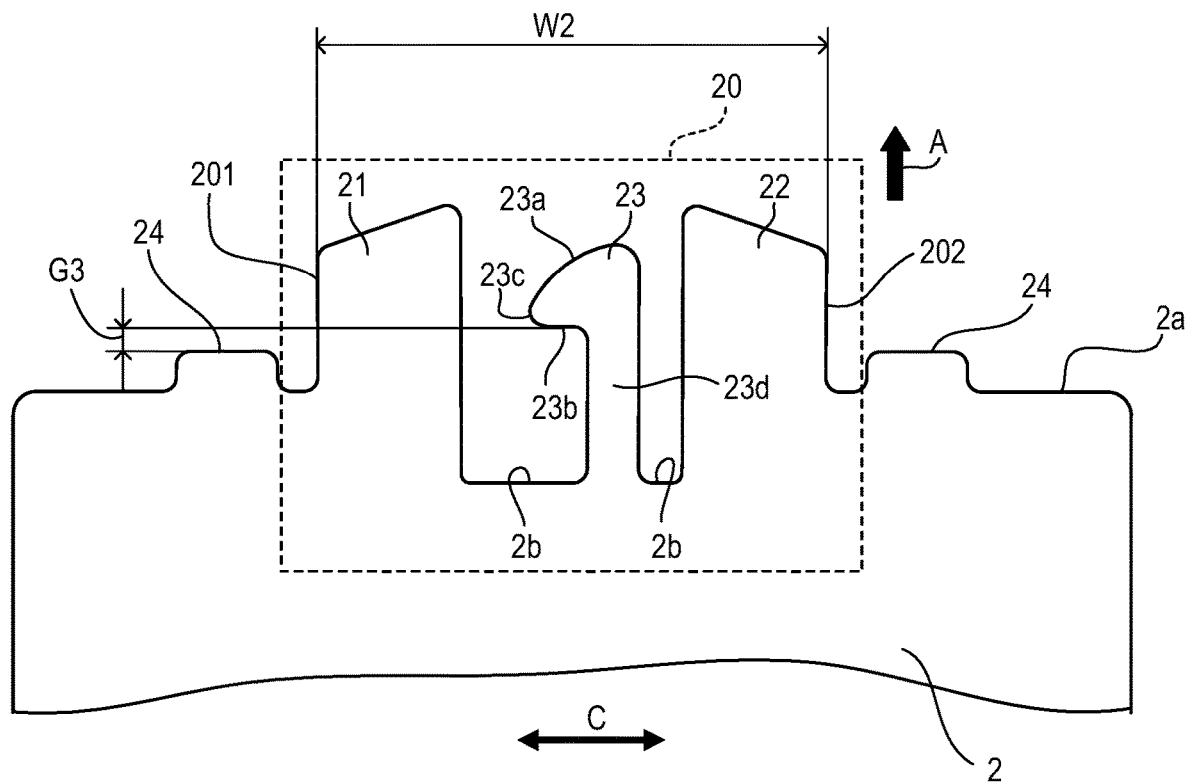
FIG. 6 is a view illustrating a shape of an engagement portion that is provided in a second metal plate of Embodiment 1.
Figure 7:
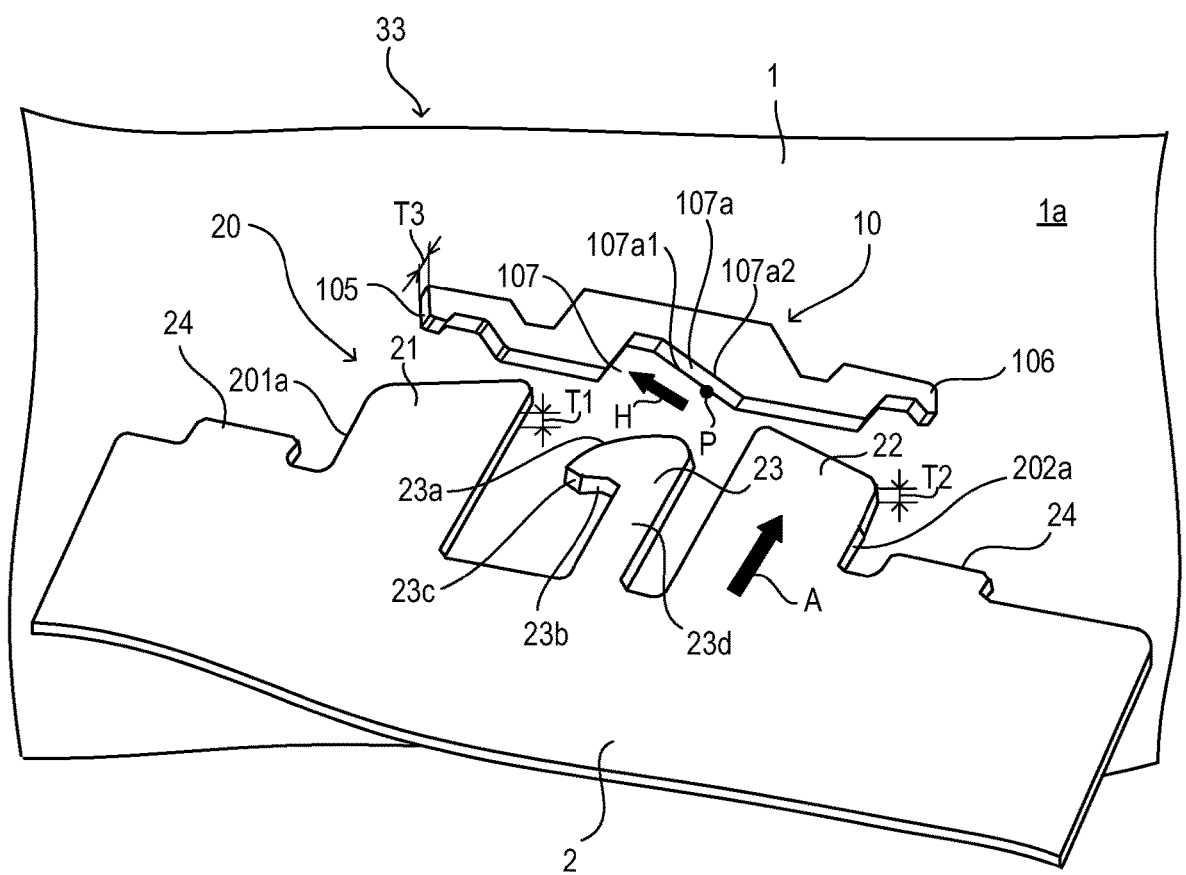
FIG. 7 is a perspective view of the positioning holding mechanism of Embodiment 1.

Hereinafter, the positioning holding mechanism 33 of Embodiment 1 will be described with reference to FIG. 4A, FIG. 4B, FIG. 4C, FIG. 4D, FIG. 5, FIG. 6 and FIG. 7. In the first metal plate 1, a through-hole 10 that causes a first side 1a to communicate with a second side 1b that is a back side of the first side 1a is formed. The second metal plate 2 includes a body portion 2a that is a metal plate having a third side 2c and a fourth side 2d that is a back side of the third side 2c, and a sheet-shaped engagement portion 20 that is integral with the body portion 2a, protrudes from the body portion 2a in a plane direction of the body portion 2a, and is inserted into the through-hole 10 to a side of the second side 1b from a side of the first side 1a of the first metal plate 1. The engagement portion 20 that is formed of a part of the second metal plate 2 is insertable into the through-hole 10 in a substantially perpendicular direction to the first side 1a of the first metal plate 1a. The positioning holding mechanism 33 inserts the engagement portion 20 formed of a part of the second metal plate 2 from the substantially perpendicular direction to the through-hole 10 formed in the first metal plate 1, and thereby performs positioning and holding of the first metal plate 1 and the second metal plate 2. FIG. 4A to FIG. 4D are explanatory views of an engagement operation of the positioning holding mechanism 33 of Embodiment 1. FIG. 4A to FIG. 4D sequentially illustrate a state of the second metal plate 2 being positioned by moving in a direction of an arrow A (hereinafter, referred to as an insertion direction) to the first metal plate 1, and being held in a fitted state. Note that the arrow A direction is a direction to advance to a side of the second side 1b from a side of the first side 1a of the first metal plate. FIG. 5 is a view illustrating a shape of the through-hole 10 provided in the first metal plate 1 of Embodiment 1. FIG. 6 is a view illustrating a shape of the engagement portion 20 provided in the second metal plate 2 of Embodiment 1. FIG. 7 is a perspective view of the positioning holding mechanism 33 of Embodiment 1. The engagement portion 20 provided in the second metal plate 2 is inserted into the through-hole 10 provided in the first metal plate 1, and thereby the positioning holding mechanism 33 can perform temporary fixing (positioning and holding) of the first metal plate 1 and the second metal plate 2.

((Positioning Operation of Holding Mechanism))

First, a positioning operation of the first metal plate 1 and the second metal plate 2 by the positioning holding mechanism 33 will be described. In the first metal plate 1, the through-hole 10 for positioning is formed. The through-hole 10 has a shape in which the engagement portion 20 of the second metal plate 2 internally contacts. The engagement portion 20 is inserted into the through-hole 10, and thereby the second metal plate 2 is positioned to the first metal plate 1. As illustrated in FIG. 5, for example, in the through-hole 10, a plurality of protrusions (regulation portions) 101, 102, 103, and 104 for positioning that protrude toward an inside from a rim of the through-hole 10 are provided. The protrusions (regulation portions) 101, 102, 103, and 104 respectively face both sides of a second protruding portion 21 and a third protruding portion 22 for regulating movement of the second metal plate 2 which is inserted into the through-hole 10 in a direction (B direction) perpendicular to the plane direction of the body portion 2a of the second metal plate 2. In the present embodiment, a number of protrusions for positioning that protrude toward the inside from the rim of the through-hole 10 is four, but is not limited to four. For example, as illustrated in FIG. 6, the engagement portion 20 includes the second protruding portion 21 and the third protruding portion 22 in sheet shapes that are integral with the body portion 2a, protrude from the body portion 2a in the plane direction of the body portion 2a, and are inserted into the through-hole 10 from a side of the first side 1a of the first metal plate 1.

A gap G1 (FIG. 5) between the first protrusion 101 and the second protrusion 102 in an up-down direction (arrow B) is set at a first distance. The first distance is a distance in which the second protruding portion 21 (first insertion portion) having a thickness T1 (FIG. 7) is fittable to (engageable with) the first protrusion 101 and the second protrusion 102 when the engagement portion 20 is inserted into the through-hole 10. The gap G1 is slightly larger than the thickness T1 so that the second protruding portion 21 is inserted between the first protrusion 101 and the second protrusion 102. A gap G2 (FIG. 5) between the third protrusion 103 and the fourth protrusion 104 in the up-down direction (arrow B) is set at a second distance. The second distance is a distance in which the third protruding portion 22 (second insertion portion) having a thickness T2 (FIG. 7) is fittable to (engageable with) the third protrusion 103 and the fourth protrusion 104 when the engagement portion 20 is inserted into the through-hole 10. The gap G2 is slightly larger than the thickness T2 so that the third protruding portion 22 is inserted between the third protrusion 103 and the fourth protrusion 104. Thereby, the second metal plate 2 is positioned to the first metal plate 1 in the up-down direction (arrow B) when the engagement portion 20 is inserted into the through-hole 10. In the present embodiment, the gap G1 is equal to the gap G2, but may be different from the gap G2. Further, in the present embodiment, the thickness T1 is equal to the thickness T2, but may be different from the thickness T2.

Further, a distance W1 (FIG. 5) between an end face (first end face) 105 and an end face (second end face) 106 of the through-hole 10 in left and right directions (arrow C) is set at a distance in which an end face 201 and an end face 202 in the arrow C direction of the engagement portion 20 are fittable to the end face 105 and the end face 106 when the engagement portion 20 is inserted into the through-hole 10. The end face (one end face) 201 of the engagement portion 20 is engageable with the end face (one end face) 105 of the through-hole 10, and the end face (another end face) 202 of the engagement portion 20 is engageable with the end face (the other end face) 106 of the through-hole 10. The distance W1 is slightly larger than a distance W2 between the end face 201 and the end face 202 of the engagement portion 20 so that the engagement portion 20 is inserted into the through-hole 10. Thereby, the second metal plate 2 is positioned to the first metal plate 1 in the left and right directions (arrow C) when the engagement portion 20 is inserted into the through-hole 10.

((Holding Operation of Holding Mechanism))

Next, a holding operation of the first metal plate 1 and the second metal plate 2 by the positioning holding mechanism 33 will be described. In the through-hole 10 of the first metal plate 1, a protrusion (hereinafter, referred to as a latching portion) 107 that protrudes toward the inside from the rim of the through-hole 10 is provided, in addition to the protrusions 101 to 104 for positioning. The latching portion (first latching portion) 107 protrudes more upward in the arrow B direction than the second protrusion 102 and the fourth protrusion 104. Further, the latching portion 107 protrudes more inward from the rim of the through-hole 10 than the second protrusion 102 and the fourth protrusion 104. As illustrated in FIG. 7, the latching portion 107 has a slope (inclined portion) 107a, a front side rim portion 107a1 that is provided at a front side of the slope 107a in an insertion direction (arrow A) and a back side rim portion 107a2 that is provided at a back side of the slope 107a in the insertion direction (arrow A). The slope 107a provided in the latching portion 107 inclines in a perpendicular direction to the insertion direction (arrow A). The slope 107a elastically deforms the first protruding portion 23 of the second metal plate 2 in a state in which movement in the B direction is regulated by the protrusions 101 to 104 for positioning so that the first protruding portion 23 is twisted around the insertion direction of the first protruding portion 23. In other words, the first protruding portion 23 rotates with the insertion direction of the first protruding portion 23 as a rotation axis and elastically deforms with respect to the body portion 2a so as to ride over the slope 107a. In the present embodiment, the latching portion 107 has a mountain shape, but the shape of the latching portion 107 is not limited to the mountain shape, and may be a triangle, a quadrangle, or semi-circle. Further, the latching portion 107 is not limited to a protrusion that protrudes toward the inside from the rim of the through-hole 10, but may be an inclined portion provided at a part of the rim of the through-hole 10.

In the engagement portion 20 of the second metal plate 2, a claw portion (hereinafter, referred to as a first protruding portion) 23 that protrudes in the insertion direction (arrow A) from the body portion 2a of the second metal plate 2, and is engageable with the latching portion 107 of the first metal plate 1 is provided. The engagement portion 20 has the first protruding portion 23, the second protruding portion 21 and the third protruding portion 22. The first protruding portion 23, the second protruding portion 21 and the third protruding portion 22 are formed integrally with the second metal plate 2. The first protruding portion (elastic member) 23 is formed at the second metal plate 2 to be elastically deformable. In the second metal plate 2, one or a plurality of butting portions 24 that protrudes in the insertion direction (arrow A) from an end portion of the body portion 2a of the second metal plate 2, and abuts on the first metal plate 1 is provided. In the present embodiment, the second metal plate 2 has the two butting portions 24. The second protruding portion 21 and the third protruding portion 22 can protrude beyond the first protruding portion 23 in the insertion direction (arrow A). In other words, when the second metal plate 2 is moved in the insertion direction (arrow A) with respect to the first metal plate 1, the first protruding portion 23 can be inserted into the through-hole 10 after the second protruding portion 21 and the third protruding portion 22 are started to be inserted into the through-hole 10. The first protruding portion 23 protrudes beyond the butting portions 24 in the insertion direction (arrow A).

In the present embodiment, the first protruding portion 23 is formed into an L-shape, but is not limited to the L-shape, and may be formed into an uncinate shape, a hook shape, a tab shape, a T-shape or the like. As illustrated in FIG. 6, the first protruding portion 23 has an abutment portion 23a provided at a tip end portion of a body portion 23d of the first protruding portion 23, a latching portion (second latching portion) 23b provided at an opposite side to the abutment portion 23a, and an end portion (connection portion) 23c that connects the abutment portion 23a and the latching portion 23b. The latching portion 23b extends in at least either one of the left and right directions (arrow C) from the body portion 23d of the first protruding portion 23. In the present embodiment, the latching portion 23b of the first protruding portion 23 extends in the left direction from the body portion 23d. The abutment portion 23a inclines in a direction in which the latching portion 23b extends in a direction opposite to the insertion direction (arrow A). The slope 107a of the latching portion 107 of the first metal plate 1 inclines in a direction in which the latching portion 23b extends from bottom to top. At both sides of the body portion 23d of the first protruding portion 23, cutout portions 2b are provided to make it easier to twist the main body portion 23d elastically. The latching portion 23b of the second metal plate 2 can be latched to the latching portion 107 of the first metal plate 1.

Figure 4A:
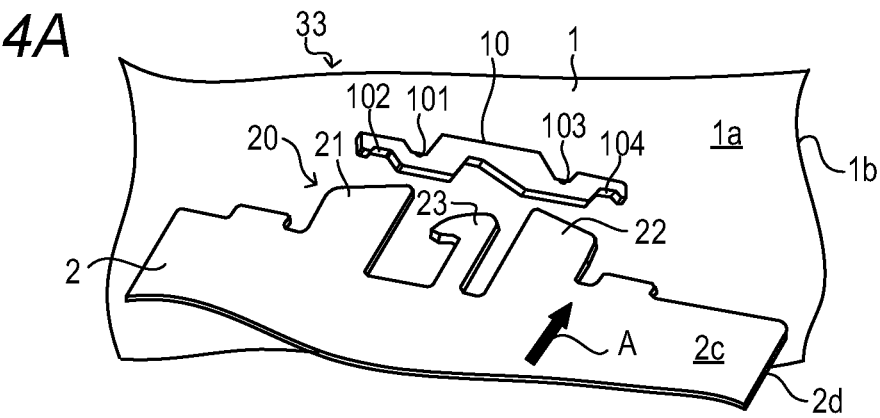
FIG. 4A is an explanatory view of an operation of a positioning holding mechanism of Embodiment 1.
Figure 4B:
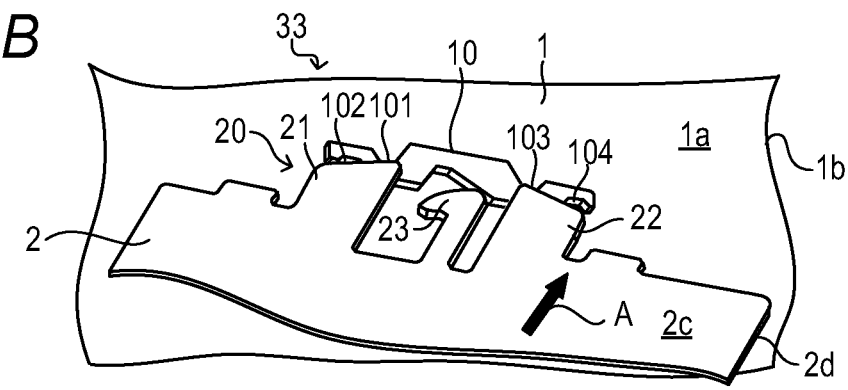
FIG. 4B is an explanatory view of the operation of the positioning holding mechanism of Embodiment 1.
Figure 4C:
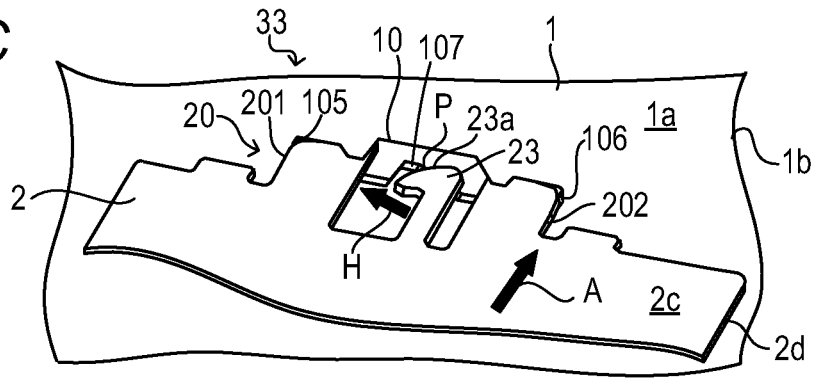
FIG. 4C is an explanatory view of the operation of the positioning holding mechanism of Embodiment 1.

As illustrated in FIG. 4A, the engagement portion 20 formed of a part of the second metal plate 2 is inserted into the through-hole 10 of the first metal plate 1 in the substantially perpendicular direction (arrow A) to the first side 1a of the first metal plate 1. The insertion direction (arrow A) of the second metal plate 2 to the first metal plate 1 is the substantially perpendicular direction to the first side 1a of the first metal plate 1. As illustrated in FIG. 4B, the second protruding portion 21 engages with the first protrusion 101 and the second protrusion 102, and is guided to the gap G1 (FIG. 5) between the first protrusion 101 and the second protrusion 102. The first protrusion 101 and the second protrusion 102 regulate movement in the up-down direction (thickness direction) (arrow B) of the second protruding portion 21 of the second metal plate 2. The third protruding portion 22 engages with the third protrusion 103 and the fourth protrusion 104, and is guided to the gap G2 between the third protrusion 103 and the fourth protrusion 104. The third protrusion 103 and the fourth protrusion 104 regulate movement in the up-down direction (thickness direction) (arrow B) of the third protruding portion 22 of the second metal plate 2. Thereby, the second metal plate 2 is positioned to the first metal plate 1 in the up-down direction. When the second metal plate 2 is further pushed in the insertion direction (arrow A), either one or both of the end face 201 and the end face 202 of the engagement portion 20 is or are guided by the end face 105 or/and the end face 106 of the through-hole 10, as illustrated in FIG. 4C. Thereby, movement of the engagement portion 20 of the second metal plate 2 is regulated in the left-right directions by the end face 105 or/and the end face 106, and the engagement portion 20 is inserted into the through-hole 10 while fitting in a predetermined range to the through-hole 10 of the first metal plate 1. Thereby, the second metal plate 2 is positioned to the first metal plate 1 in the left and right directions.

Figure 4D:
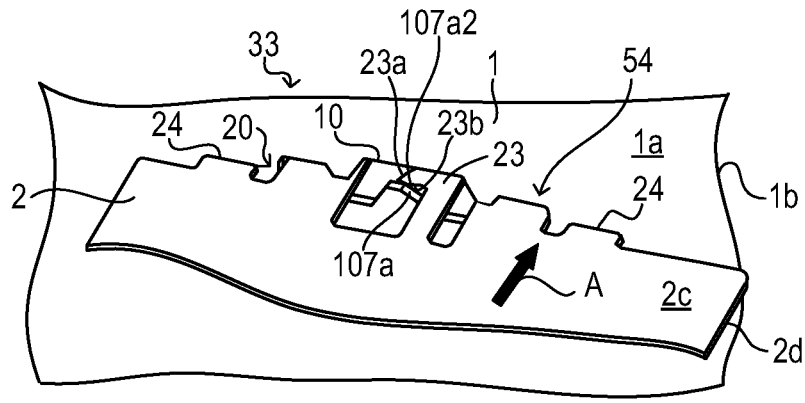
FIG. 4D is an explanatory view of the operation of the positioning holding mechanism of Embodiment 1.

As illustrated in FIG. 4C, the abutment portion 23a of the first protruding portion 23 makes point contact with the front side rim portion 107a1 (FIG. 7) of the latching portion 107 at a contact point P. When the second metal plate 2 is further inserted into the through-hole 10, the abutment portion 23a receives a reaction force from the contact point P, and the first protruding portion 23 is twisted around the insertion direction by elastic deformation. The abutment portion 23a is provided with roundness so as to move easily in a state of contacting the front side rim portion 107a1. As the contact point P moves in an arrow H direction, twisting deformation (elastic deformation) of the first protruding portion 23 increases due to the reaction force from the contact point P, and the first protruding portion 23 is inserted into the through-hole 10. When insertion further advances, the abutment portion 23a of the first protruding portion 23 rides over the front side rim portion 107a1 of the slope 107a, and the latching portion 23b of the first protruding portion 23 reaches the back side rim portion 107a2 of the slope 107a, the first protruding portion 23 does not receive the reaction force from the latching portion 107. When the latching portion 23b of the first protruding portion 23 rides over the back side rim portion 107a2 of the slope 107a, as illustrated in FIG. 4D, twisting deformation of the first protruding portion 23 is released, and the first protruding portion 23 returns to an original position. When the first protruding portion 23 returns to the original position, the latching portion (engagement portion) 23b of the first protruding portion 23 is latched by the second side (back side of the first side 1a) 1b of the latching portion 107 so that the tip end side of the first protruding portion 23 does not remove from the through-hole 10. The latching portion 23b engages with the latching portion 107, and thereby the second metal plate 2 is held so as not to remove from the first metal plate 1. At this time, the two butting portions 24 of the second metal plate 2 abut on the first metal plate 1. The first metal plate 1 is held by the latching portion 23b and the butting portions 24 of the second metal plate 2. Thereby, the second metal plate 2 is temporarily fixed (held) in a state of being positioned to the first metal plate 1.

A gap 3 (FIG. 6) between the latching portion 23b of the first protruding portion 23 and the butting portion 24 in the insertion direction (arrow A) is set at a distance in which the first metal plate 1 is fitted between the latching portion 23b and the butting portion 24. The gap G3 is set at a substantially same value as a thickness T3 (FIG. 7) in a vicinity of the through-hole 10 of the first metal plate 1 so that the first metal plate 1 is held between the latching portion 23b and the butting portion 24. The gap G3 can be slightly larger than the thickness T3. Thereby, the second metal plate 2 is positioned to the first metal plate 1 in the insertion direction (arrow A) in a state in which the first metal plate 1 is fitted between the latching portion 23b of the second metal plate 2 and the butting portion 24, when the engagement portion 20 is inserted into the through-hole 10. In this way, the second metal plate 2 is positioned to the first metal plate 1 in the up-down direction (arrow B), the left and right directions (arrow C) and an extraction direction at an opposite side to the insertion direction (arrow A) that is a front-rear direction, and thereby the second metal plate 2 is held by the first metal plate 1 substantially perpendicularly to the first side 1a of the first metal plate 1.

Note that in order to reduce an insertion force necessary to insert the engagement portion 20 of the second metal plate 2 to the through-hole 10 of the first metal plate 1, the abutment portion 23a can have a curvature (protruded side). In the present embodiment, the abutment portion 23a has a curvature as illustrated in FIG. 6, but may have a slope shape with a gradient in the insertion direction (arrow A). When the abutment portion 23a has the slope shape, an effect of reduction of the insertion force is obtained. In the present embodiment, the latching portion 107 of the first metal plate 1 has the slope 107a as illustrated in FIG. 5, but when the latching portion 107 has a curvature (protruded side), a similar effect can also be obtained. A gradient or roundness may be provided at the end portion 23c between the abutment portion 23a and the latching portion 23b in order that the first protruding portion 23 easily returns to the original state by an elastic force after the abutment portion 23a of the first protruding portion 23 of the second metal plate 2 passes through the slope 107a of the latching portion 107 of the first metal plate 1. By the gradient or roundness of the end portion 23c, release of the elastic deformation of the first protruding portion 23 becomes easy. Further, the gradient or roundness of the end portion 23c exhibits an effect of the second metal plate 2 being drawn toward the first metal plate 1 by using a restoration force of the first protruding portion 23 at a time of the elastic deformation of the first protruding portion being released.

According to the positioning holding mechanism 33 of the present embodiment, reduction in size of the through-hole 10 of the first metal plate 1 is enabled, and therefore reduction in strength of the connection portion 54 of the first metal plate 1 and the second metal plate 2 can be suppressed. With reduction in size of the through-hole 10 of the first metal plate 1, reduction in size of the engagement portion 20 of the second metal plate 2 is enabled, and therefore a protrusion amount of the engagement portion 20 of the second metal plate 2 in the connection portion 54 of the first metal plate 1 and the second metal plate 2 can be reduced. Consequently, a degree of freedom of disposition of components in a vicinity of the connection portion 54 of the first metal plate 1 and the second metal plate 2 is enhanced. The second metal plate 2 is held in a state of being fitted to the first metal plate 1 in three directions of the up-down direction, the left and right directions and the front-rear direction (insertion direction), and therefore, a backlash between the first metal plate 1 and the second metal plate 2 after the second metal plate 2 is temporarily fixed to the first metal plate 1 can be decreased. Consequently, the connection portion (temporary fixing portion) 54 of the first metal plate 1 and the second metal plate 2 can be held in a stable state.

The second metal plate 2 is held by the first metal plate 1 in the state in which the second metal plate 2 is positioned to the first metal plate 1 by the positioning holding mechanism 33. The second metal plate 2 is temporarily fixed to the first metal plate 1 by the positioning holding mechanism 33 so that the second metal plate 2 does not remove from the first metal plate 1 while a positioned state of the first metal plate 1 and the second metal plate 2 is kept, and the positioned state can be held. According to the present embodiment, positioning of the first metal plate 1 and the second metal plate 2, and holding of the positioned state can be easily performed. In the state in which the second metal plate 2 is temporarily fixed to the first metal plate 1 by the positioning holding mechanism 33, the connection portion 54 of the first metal plate 1 and the second metal plate 2 is fixed by laser welding. Consequently, according to the positioning holding mechanism 33 of the present embodiment, an angle between the first metal plate 1 and the second metal plate 2 can be prevented from deviating from a predetermined angle, and a relative position between the first metal plate 1 and the second metal plate 2 can be prevented from deviating from a predetermined position. According to the present embodiment, assembly of the frame body 31 of the image forming apparatus 30 can be facilitated.

Note that the engagement portion 20 may also be provided at another end portion of the second metal plate 2, and the engagement portion 20 may be connected to a through-hole that is provided in the third metal plate 53 by the positioning holding mechanism 33. In the third metal plate 53, another through-hole that causes a fifth side and a sixth side that is a back side of the fifth side to communicate with each other is formed. A fourth protruding portion, a fifth protruding portion and a sixth protruding portion in sheet shapes are provided at the other end portion of the second metal plate 2. In other words, the engagement portions 20 may be provided at both the end portions of the second metal plate 2. The fourth protruding portion, the fifth protruding portion and the sixth protruding portion are integral with the body portion 2a of the second metal plate 2, protrude from the body portion 2a in the plane direction of the body portion 2a, and is inserted into the through-hole of the third metal plate 53 from a side of the fifth side of the third metal plate 53. A rim of the other through-hole of the third metal plate 53 is provided with a third end face that faces an end face of the fifth protruding portion in a direction orthogonal to the insertion direction and a through-thickness direction of the second metal plate 2, and regulates movement of the second metal plate 2 in the orthogonal direction, a fourth end face that is at an opposite side to the third end face in the orthogonal direction, faces an end face of the sixth protruding portion in the orthogonal direction, and regulates movement of the second metal plate in the orthogonal direction, other regulation portions that are for regulating movement of the second metal plate that is inserted into the other through-hole of the third metal plate 53 in the through-thickness direction of the second metal plate 2, and respectively face a third side and the fourth side of the fifth protruding portion and the sixth protruding portion, and another slope that elastically deforms the fourth protruding portion so that the fourth protruding portion rotates with the insertion direction of the fourth protruding portion as a rotation axis in a state in which movement in the orthogonal direction and the through-thickness direction is regulated by the third end face, the fourth end face and the other regulation portions when the fourth protruding portion, the fifth protruding portion and the sixth protruding portion are inserted into the other through-hole of the third metal plate 53. The fourth protruding portion includes an engagement portion that engages with the sixth side of the third metal plate 53 so that a tip end side of the fourth protruding portion does not remove from the through-hole in a state in which the fourth protruding portion rides over the slope and the elastic deformation is released. After the first metal plate 1 and the third metal plate 53 are connected by the positioning holding mechanism 33, the second metal plate 2 is fixed to the first metal plate 1 and the third metal plate 53 by laser welding. According to the present embodiment, assembly of the frame body 31 of the image forming apparatus 30 can be easily performed in this way.

According to the present embodiment, the second metal plate 2 can be positioned to the first metal plate 1 and held so that the second metal plate 2 does not easily remove from the first metal plate 1.

Embodiment 2

Hereinafter, Embodiment 2 will be described with reference to FIG. 8A, FIG. 8B, FIG. 8C, FIG. 8D, FIG. 9, FIG. 10 and FIG. 11. In Embodiment 2, same structures as the structures in Embodiment 1 are assigned with the same reference signs, and explanation will be omitted. The image forming apparatus 30 and the frame body 31 of Embodiment 2 are the same as the image forming apparatus 30 and the frame body 31 of Embodiment 1, and therefore explanation will be omitted. A positioning holding mechanism 73 in Embodiment 2 differs from the positioning holding mechanism 33 in Embodiment 1. In Embodiment 1, in the first metal plate 1, the only one through-hole 10 for the positioning holding mechanism 33 is provided. In contrast with this, in Embodiment 2, in the first metal plate 1, a plurality of through-holes 11, 12 and 13 for the positioning holding mechanism 73 are provided. Hereinafter, a difference will be mainly described.

(Holding Mechanism)

Figure 9:
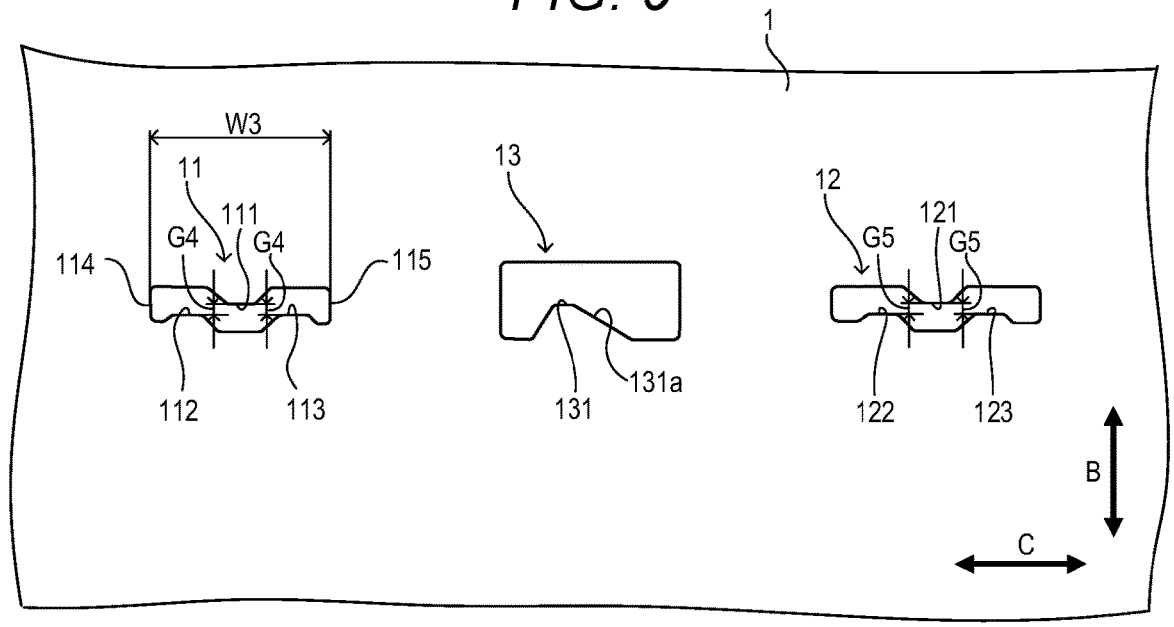
FIG. 9 is a view illustrating a shape of a through-hole that is provided in a first metal plate of Embodiment 2.
Figure 10:
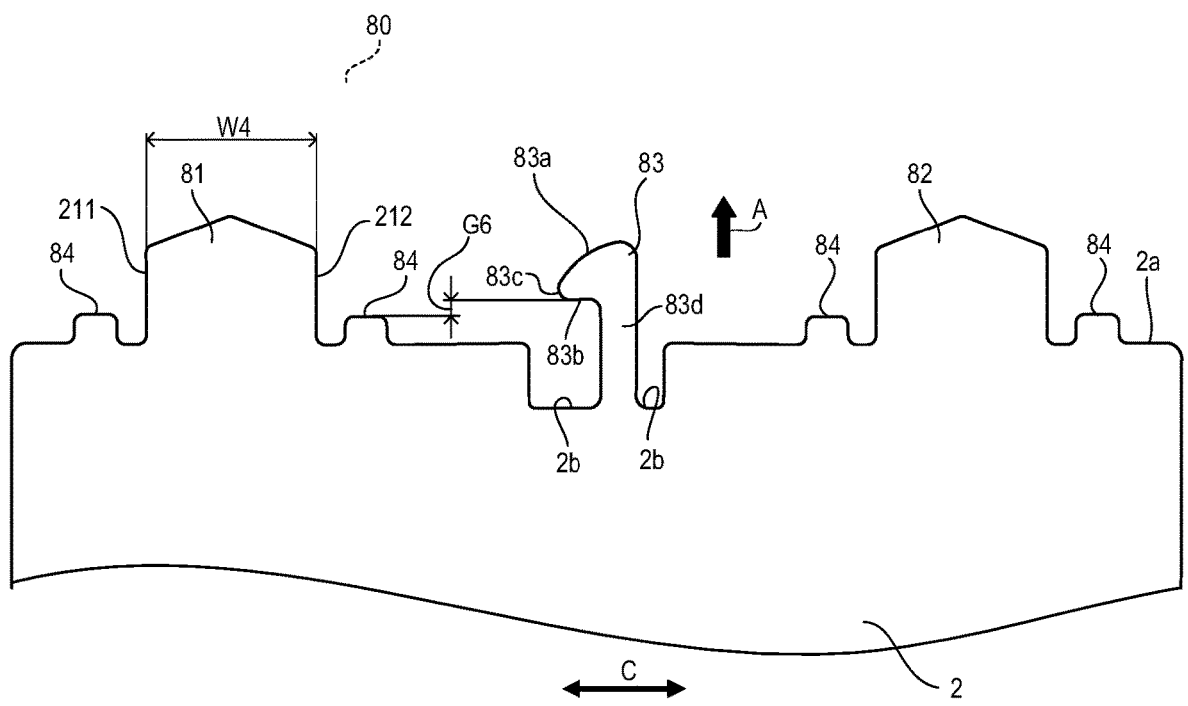
FIG. 10 is a view illustrating a shape of an engagement portion that is provided in a second metal plate of Embodiment 2.
Figure 11:
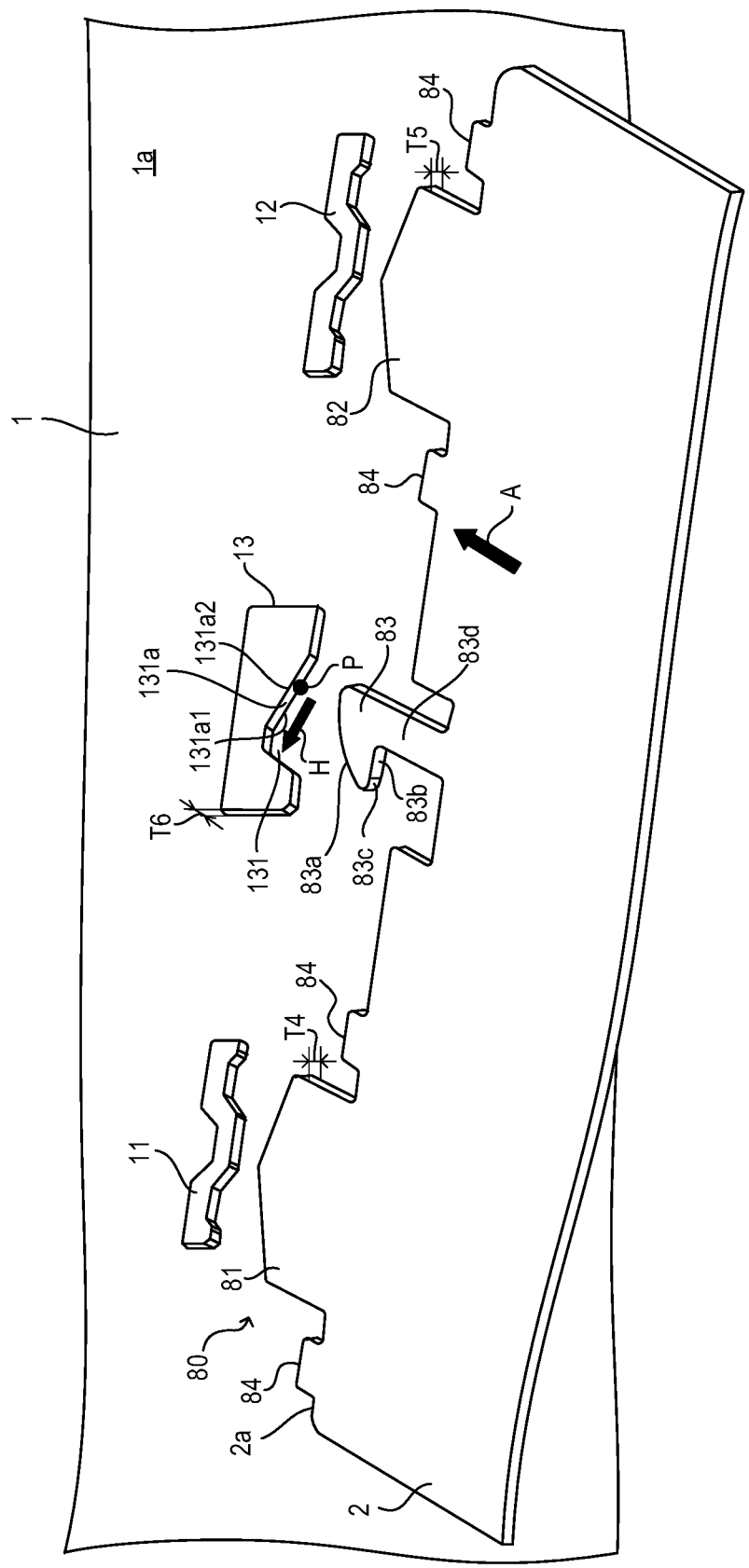
FIG. 11 is a perspective view of the positioning holding mechanism of Embodiment 2.

Hereinafter, the positioning holding mechanism 73 of Embodiment 2 will be described with reference to FIG. 8A to FIG. 11. In the first metal plate 1, the plurality of through-holes 11, 12 and 13 that cause the first side 1a and the second side 1b that is a back side of the first side to communicate with each other are formed. An engagement portion 80 formed of a part of the second metal plate 2 is insertable into the plurality of through-holes 11, 12 and 13 in a substantially perpendicular direction to the first side 1a of the first metal plate 1. The positioning holding mechanism 73 of Embodiment 2 performs positioning of the first metal plate 1 and the second metal plate 2 and holding thereof by inserting the engagement portion 80 formed of a part of the second metal plate 2 in the substantially perpendicular direction to the plurality of through-holes 11, 12 and 13 that are formed in the first metal plate 1. FIG. 8A to FIG. 8D are explanatory views of an operation of the positioning holding mechanism 73 in Embodiment 2. FIG. 8A to FIG. 8D sequentially illustrate a state in which the second metal plate 2 is positioned to the first metal plate 1 by moving in the insertion direction (arrow A), and is held in a fitted state. FIG. 9 is a view illustrating shapes of the through-holes 11, 12, and 13 that are provided in the first metal plate 1 in Embodiment 2. FIG. 10 is a view illustrating a shape of the engagement portion 80 provided in the second metal plate 2 of Embodiment 2. FIG. 11 is a perspective view of the positioning holding mechanism 73 in Embodiment 2. The positioning holding mechanism 73 can perform temporary fixing (positioning and holding) of the first metal plate 1 and the second metal plate 2 by inserting the engagement portion 80 provided in the second metal plate 2 into the plurality of through-holes 11, 12 and 13 that are provided in the first metal plate 1.

((Positioning Operation of Holding Mechanism))

First, a positioning operation of the first metal plate 1 and the second metal plate 2 by the positioning holding mechanism 73 will be described. In the first metal plate 1, the second through-hole 11 and the third through-hole 12 for positioning are formed. The second through-hole 11 and the third through-hole 12 have shapes where a second protruding portion 81 and a third protruding portion 82 of the engagement portion 80 of the second metal plate 2 internally contact the second through-hole 11 and the third through-hole 12 respectively. The second protruding portion 81 of the engagement portion 80 is inserted into the second through-hole 11, and the third protruding portion 82 of the engagement portion 80 is inserted into the third through-hole 12, whereby the second metal plate 2 is positioned to the first metal plate 1 in the arrow B direction (FIG. 9). As illustrated in FIG. 9, for example, in the second through-hole 11, a plurality of protrusions (regulation portions) 111, 112 and 113 that protrude toward an inside from a rim of the second through-hole 11 are provided. The protrusions (regulation portions) 111, 112, and 113 respectively face both sides of a first side of the second protruding portion 81 and a back side of the first side for regulating movement of the second metal plate 2 that is inserted into the second through-hole 11 in a direction (B direction) perpendicular to a plane direction of the body portion 2a of the second metal plate 2. In the third through-hole 12, a plurality of protrusions (regulation portions) 121, 122 and 123 for positioning that protrude toward an inside from a rim of the third through-hole 12 are provided. The protrusions (regulation portions) 121, 122 and 123 respectively face both sides of a third protruding portion 82 for regulating movement of the second metal plate 2 that is inserted into the third through-hole 12 in the direction (B direction) perpendicular to the plane direction of the body portion 2a of the second metal plate 2. In the present embodiment, the number of protrusions for positioning that protrude toward the inside from each of the rims of the second through-hole 11 and the third through-hole 12 is three, but is not limited to three. The engagement portion 80 is integral with the body portion 2a of the second metal plate 2, and includes the second protruding portion 81 and the third protruding portion 82 in sheet shapes that are respectively inserted into the second through-hole 11 and the third through-hole 12 respectively from a side of the first side 1a of the first metal plate 1, as illustrated in FIG. 10, for example. The second protruding portion 81 (first insertion portion) is inserted into the second through-hole 11. The third protruding portion 82 (second insertion portion) is inserted into the third through-hole 12.

In the second through-hole 11, the first protrusion 111, the second protrusion 112 and the third protrusion 113 are provided. A gap G4 (FIG. 9) between the first protrusion 111 and the second protrusion 112 in the up-down direction (arrow B) is set at a third distance. The third distance is a distance in which the second protruding portion 81 having a thickness T4 (FIG. 11) is in a state of being fitted to the first protrusion 111 and the second protrusion 112 when the second protruding portion 81 is inserted into the second through-hole 11. The gap G4 between the first protrusion 111 and the third protrusion 113 in the up-down direction is also set at a distance in which the second protruding portion 81 is in a state of being fitted to the first protrusion 111 and the third protrusion 113 when the second protruding portion 81 is inserted into the second through-hole 11. The gap G4 is slightly larger than the thickness T4 so that the second protruding portion 81 is inserted between the first protrusion 111, and the second protrusion 112 and the third protrusion 113.

In the third through-hole 12, the first protrusion 121, the second protrusion 122 and the third protrusion 123 are provided. A gap G5 (FIG. 9) between the first protrusion 121 and the second protrusion 122 in the up-down direction (arrow B) is set at a fourth distance. The forth distance is a distance in which the third protruding portion 82 having a thickness T5 (FIG. 11) is in a state of being fitted to the first protrusion 121 and the second protrusion 122 when the third protruding portion 82 is inserted into the third through-hole 12. The gap G5 between the first protrusion 121 and the third protrusion 123 in the up-down direction is also set at a distance in which the third protruding portion 82 is in a state of being fitted to the first protrusion 121 and the third protrusion 123 when the third protruding portion 82 is inserted into the third through-hole 12. The gap G5 is slightly larger than the thickness TS so that the third protruding portion 82 is inserted between the first protrusion 121, and the second protrusion 122 and the third protrusion 123.

Thereby, when the second protruding portion 81 and the third protruding portion 82 of the engagement portion 80 are respectively inserted into the second through-hole 11 and the third through-hole 12, the second metal plate 2 is positioned to the first metal plate 1 in the up-down direction (arrow B). In the present embodiment, the gap G4 is equal to the gap GS, but may be different from the gap GS. Further, in the present embodiment, the thickness T4 is equal to the thickness TS, but may be different from the thickness TS.

Further, a distance W3 (FIG. 9) between an end face (first end face) 114 and an end face (second end face) 115 of the second through-hole 11 in the left and right directions (arrow C) is set at a distance in which an end face 211 and an end face 212 of the second protruding portion 81 are fittable to the end faces 114 and 115 when the second protruding portion 81 is inserted into the second through-hole 11. The end face (one end face) 211 of the second protruding portion 81 is engageable with the end face (one end face) 114 of the second through-hole 11, and the end face (the other end face) 212 of the second protruding portion 81 is engageable with the end face (the other end face) 115 of the second through-hole 11. The distance W3 is slightly larger than a distance W4 between the end face 211 and the end face 212 of the second protruding portion 81 so that the second protruding portion 81 is inserted into the second through-hole 11. Accordingly, when the second protruding portion 81 is inserted into the second through-hole 11, the second metal plate 2 is positioned to the first metal plate 1 in the left and right directions (arrow C). In the present embodiment, positioning in the left and right directions (arrow C) is performed by using the second through-hole 11 and the second protruding portion 81, but positioning in the left and right directions may be performed by using the other through-hole (for example, the third through-hole 12) and the other protruding portion (for example, the third protruding portion 82).

((Holding Operation of Holding Mechanism))

Next, a holding operation of the first metal plate 1 and the second metal plate 2 by the positioning holding mechanism 73 will be described. In the first metal plate 1, the first through-hole 13 is provided in a vicinity of the second through-hole 11 and the third through-hole 12. In the present embodiment, the first through-hole 13 is provided between the second through-hole 11 and the third through-hole 12. However, the first through-hole 13 may be provided at an opposite side to the third through-hole 12 with respect to the second through-hole 11, or may be provided at an opposite side to the second through-hole 11 with respect to the third through-hole 12. In the first through-hole 13, a protrusion (hereinafter, referred to as a latching portion) 131 that protrudes toward an inside from a rim of the first through-hole 13 is provided. The latching portion (first latching portion) 131 protrudes more upward than the second protrusion 112 and the third protrusion 113 of the second through-hole 11 and the second protrusion 122 and the third protrusion 123 of the third through-hole 12. As illustrated in FIG. 11, the latching portion 131 has a slope (inclined portion) 131a, a front side rim portion 131a1 that is provided at a front side of the slope 131a in the insertion direction (arrow A), and a back side rim portion 131a2 that is provided at a back side of the slope 131a in the insertion direction (arrow A). The slope 131a that is provided in the latching portion 131 inclines in a direction perpendicular to the insertion direction (arrow A). The slope 131a twists and deforms the first protruding portion 83 of the second metal plate 2 movement of which is regulated in the B direction by the protrusions 111, 112, 113, 121, 122, and 123 for positioning, around the insertion direction of the first protruding portion 83. In the present embodiment, the latching portion 131 has a mountain shape, but a shape of the latching portion 131 is not limited to the mountain shape, and may be a triangle, a quadrangle, or a semi-circle. Further, the latching portion 131 is not limited to the protrusion that protrudes toward the inside from the rim of the first through-hole 13, but may be an inclined portion formed in a part of the rim of the first through-hole 13.

In the engagement portion 80 of the second metal plate 2, a claw portion (hereinafter, referred to as a first protruding portion) 83 that protrudes in the insertion direction (arrow A) from the body portion 2a of the second metal plate 2 and is engageable with the latching portion 131 of the first metal plate 1 is provided. The engagement portion 80 has the first protruding portion 83, the second protruding portion 81 and the third protruding portion 82. The first protruding portion 83, the second protruding portion 81 and the third protruding portion 82 are formed integrally with the second metal plate 2. The first protruding portion (elastic member) 83 is formed at the second metal plate 2 to be elastically deformable to the body portion 2a. In the second metal plate 2, one or a plurality of butting portions 84 that protrude in the insertion direction (arrow A) from the body portion 2a of the second metal plate 2, and abut on the first metal plate 1 is provided. In the present embodiment, the second metal plate 2 has four butting portions 84. The second protruding portion 81 and the third protruding portion 82 can protrude beyond the first protruding portion 83 in the insertion direction (arrow A). In other words, when the second metal plate 2 is moved in the insertion direction (arrow A) with respect to the first metal plate 1, the first protruding portion 83 can be inserted into the first through-hole 13 after the second protruding portion 81 and the third protruding portion 82 are respectively started to be inserted into the second through-hole 11 and the third through-hole 12. The first protruding portion 83 protrudes beyond the butting portion 84 in the insertion direction (arrow A).

In the present embodiment, the first protruding portion 83 is formed into an L-shape, but is not limited to the L-shape, but may be formed into an uncinate shape, a hook shape, a tab shape, a T-shape or the like. As illustrated in FIG. 10, the first protruding portion 83 has an abutment portion 83a that is provided at a tip end portion of a body portion 83d of the first protruding portion 83, a latching portion (second latching portion) 83b that is provided at a side opposite to the abutment portion 83a, and an end portion (connection portion) 83c that connects the abutment portion 83a and the latching portion 83b. The latching portion 83b extends to at least either one of the left and right directions (arrow C) from the body portion 83d of the first protruding portion 83. In the present embodiment, the latching portion 83b of the first protruding portion 83 extends in a left direction from the body portion 83d. The abutment portion 83a inclines in a direction in which the latching portion 83b extends to an opposite direction to the insertion direction (arrow A). The slope 131a of the latching portion 131 of the first metal plate 1 inclines in the direction in which the latching portion 83b extends to top from bottom. Cutout portions 2b are provided at both sides of the body portion 83d of the first protruding portion 83 so as to make the first protruding portion 83 twist elastically easily. The latching portion 83b of the second metal plate 2 can be latched to the latching portion 131 of the first metal plate 1.

Figure 8A:
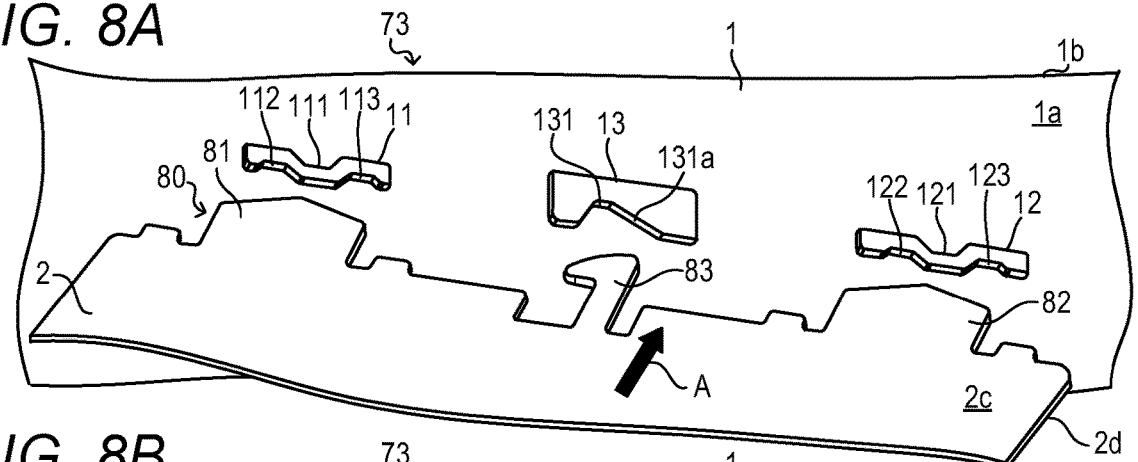
FIG. 8A is an explanatory view of an operation of a positioning holding mechanism of Embodiment 2.
Figure 8B:
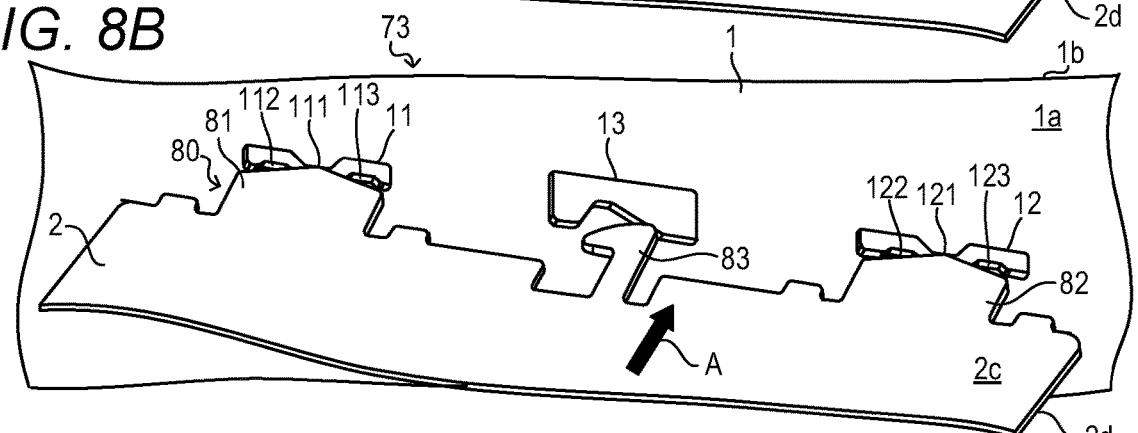
FIG. 8B is an explanatory view of the operation of the positioning holding mechanism of Embodiment 2.
Figure 8C:
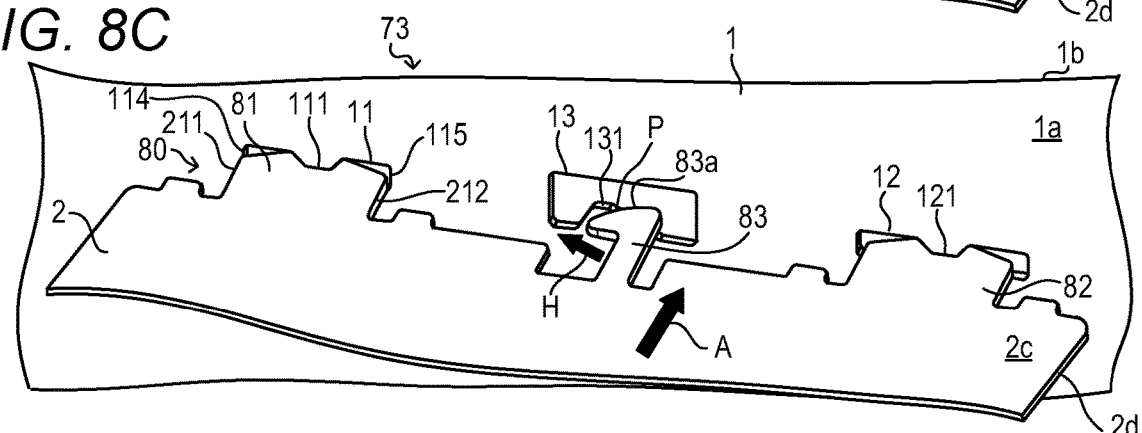
FIG. 8C is an explanatory view of the operation of the positioning holding mechanism of Embodiment 2.

As illustrated in FIG. 8A, the second protruding portion 81 of the engagement portion 80 formed of a part of the second metal plate 2 is inserted into the second through-hole 11, and the third protruding portion 82 is inserted into the third through-hole 12 in the substantially perpendicular direction (arrow A) to the first side 1a of the first metal plate 1. The insertion direction (arrow A) of the second metal plate 2 to the first metal plate 1 is the substantially perpendicular direction to the first metal plate 1. As illustrated in FIG. 8B, the second protruding portion 81 engages with the first protrusion 111, the second protrusion 112 and the third protrusion 113 of the second through-hole 11, and is guided into the gap G4 (FIG. 9) between the first protrusion 111, and the second protrusion 112 and the third protrusion 113. The first protrusion 111, the second protrusion 112 and the third protrusion 113 regulate movement in the up-down direction (thickness direction) (arrow B) of the second protruding portion 81 of the second metal plate 2. The third protruding portion 82 engages with the first protrusion 121, the second protrusion 122 and the third protrusion 123 of the third through-hole 12, and is guided to the gap G5 (FIG. 9) between the first protrusion 121, and the second protrusion 122 and the third protrusion 123. The first protrusion 121, the second protrusion 122 and the third protrusion 123 regulate movement in the up-down direction (thickness direction) (arrow B) of the third protruding portion 82 of the second metal plate 2. Accordingly, the second metal plate 2 is positioned to the first metal plate 1 in the up-down direction. Further, when the second metal plate 2 is pushed into the insertion direction (arrow A), either one or both of the end face 211 and the end face 212 of the second protruding portion 81 is or are guided by the end face 114 or/and the end face 115 of the second through-hole 11, as illustrated in FIG. 8C. Accordingly, movement of the second protruding portion 81 and the third protruding portion 82 of the engagement portion 80 of the second metal plate 2 is regulated in the left and right directions by the end face 114 or/and the end face 115. The second protruding portion 81 and the third protruding portion 82 of the engagement portion 80 of the second metal plate 2 are inserted into the second through-hole 11 and the third through-hole 12 while fitting in a predetermined range to the second through-hole 11 and the third through-hole 12 of the first metal plate 1. Accordingly, the second metal plate 2 is positioned to the first metal plate 1 in the left and right directions.

Figure 8D:
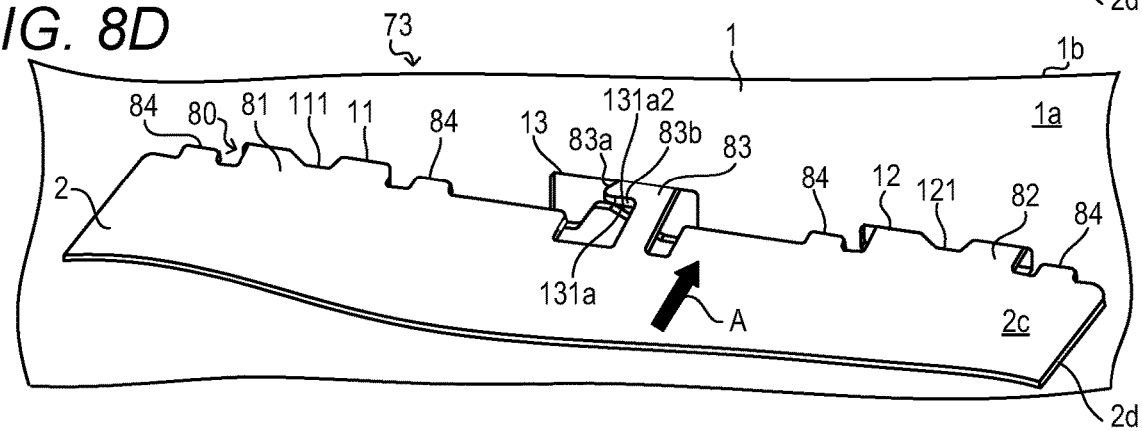
FIG. 8D is an explanatory view of the operation of the positioning holding mechanism of Embodiment 2.

As illustrated in FIG. 8C, the abutment portion 83a of the first protruding portion 83 makes point contact with the front side rim portion 131a1 (FIG. 11) of the latching portion 131 at a contact point P. When the second metal plate 2 is further moved in the insertion direction (arrow A), the abutment portion 83a receives a reaction force from the contact point P, and the first protruding portion 83 twists around the insertion direction by elastic deformation. The abutment portion 83a is provided with roundness so as to easily move in a state of contacting the front side rim portion 131a1. As the contact point P moves in an arrow H direction, twisting deformation (elastic deformation) of the first protruding portion 83 increases due to the reaction force from the contact point P, and the first protruding portion 83 is inserted into the first through-hole 13. When insertion further advances, the abutment portion 83a of the first protruding portion 83 rides over the front side rim portion 131a1 of the slope 131a, and the latching portion 83b of the first protruding portion 83 reaches the back side rim portion 131a2 of the slope 131a, the first protruding portion 83 does not receive the reaction force from the latching portion 131. As illustrated in FIG. 8D, the twisting deformation of the latching portion 83b of the first protruding portion 83 is released, and the first protruding portion 83 returns to an original position. When the first protruding portion 83 returns to the original position, the latching portion (engagement portion) 83b of the first protruding portion 83 is latched by a second side (back side of the first side 1a) 1b of the latching portion 131 so that a tip end side of the first protruding portion 83 does not remove from the first through-hole 13. The latching portion 83b engages with the latching portion 131, whereby the second metal plate 2 is held so as not to remove from the first metal plate 1. At this time, the four butting portions 84 of the second metal plate 2 abut on the first metal plate 1. The first metal plate 1 is held by the latching portion 83b and the butting portions 84 of the second metal plate 2. Accordingly, the second metal plate 2 is temporarily fixed (held) in the state of being positioned to the first metal plate 1.

A gap G6 (FIG. 10) between the latching portion 83b of the first protruding portion 83 and the butting portion 84 in the insertion direction (arrow A) is set at a distance in which the first metal plate 1 is fitted between the latching portion 83b and the butting portion 84. The gap G6 is set at a substantially same value as a thickness T6 (FIG. 11) in a vicinity of the first through-hole 13 of the first metal plate 1 so that the first metal plate 1 is held between the latching portion 83b and the butting portion 84. The gap G6 can be slightly larger than the thickness T6. Accordingly, when the first protruding portion 83 is inserted into the first through-hole 13, the second metal plate 2 is positioned to the first metal plate 1 in the insertion direction (arrow A) in a state in which the first metal plate 1 is fitted between the latching portion 83b of the first protruding portion 83 and the butting portion 84. In this way, the second metal plate 2 is positioned to the first metal plate 1 in the up-down direction (arrow B), the left and right directions (arrow C), and the insertion direction (arrow A) that is a front-rear direction, and thereby the second metal plate 2 is held substantially perpendicularly to the first side 1a of the first metal plate 1.

Note that in order to reduce a necessary insertion force for inserting the first protruding portion 83 of the second metal plate 2 to the first through-hole 13 of the first metal plate 1, the abutment portion 83a can have a curvature (protruded side). In the present embodiment, the abutment portion 83a has a curvature as illustrated in FIG. 10, but may have a slope shape having a gradient to the insertion direction (arrow A). When the abutment portion 83a has a slope shape, an effect of reduction of the insertion force can also be obtained. In the present embodiment, the latching portion 131 of the first metal plate 1 has the slope 131a as illustrated in FIG. 9, but when the latching portion 131 has a curvature (protruded side), a similar effect can also be obtained. Further, a gradient or roundness may be provided at the end portion 83c between the abutment portion 83a and the latching portion 83b in order that the first protruding portion 83 easily returns to the original state by the elastic force after the abutment portion 83a of the first protruding portion 83 of the second metal plate 2 passes through the slope 131a of the latching portion 131 of the first metal plate 1. By the gradient or roundness of the end portion 83c, release of the elastic deformation of the first protruding portion 83 becomes easy. Further, the gradient or roundness of the end portion 83c exhibits an effect that the second metal plate 2 is drawn toward the first metal plate 1 by using a restoration force of the first protruding portion 83 at a time of the elastic deformation of the first protruding portion 83 being released.

According to the holding mechanism 73 of the present embodiment, respective sizes of the first through-hole 13, the second through-hole 11 and the third through-hole 12 can be decreased by distributing and disposing the first through-hole 13, the second through-hole 11 and the third through-hole 12 of the first metal plate 1. Accordingly, reduction in strength of the connection portion 54 of the first metal plate 1 and the second metal plate 2 can be suppressed. With reduction in size of the first through-hole 13, the second through-hole 11 and the third through-hole 12 of the first metal plate 1, reduction in size of the engagement portion 80 of the second metal plate 2 is enabled, and therefore a protruding amount of the engagement portion 80 of the second metal plate 2 in the connection portion 54 of the first metal plate 1 and the second metal plate 2 can be reduced. Accordingly, a degree of freedom of component disposition in a vicinity of the connection portion 54 of the first metal plate 1 and the second metal plate 2 is enhanced. The second metal plate 2 is held in a state of being fitted to the first metal plate 1 in three directions of the up-down direction, the left and right directions and the front-rear direction (insertion direction), and therefore backlash between the first metal plate 1 and the second metal plate 2 after the second metal plate 2 is temporarily fixed to the first metal plate 1 can be decreased. Accordingly, the connection portion (temporary fixing portion) 54 of the first metal plate 1 and the second metal plate 2 can be held in a stable state.

By the positioning holding mechanism 73, the second metal plate 2 is held by the first metal plate 1 in the state in which the second metal plate 2 is positioned to the first metal plate 1. The second metal plate 2 can be temporarily fixed to the first metal plate 1 by the positioning holding mechanism 73 so that the second metal plate 2 does not remove from the first metal plate 1 while a positioned state of the second metal plate 2 to the first metal plate 1 is kept. According to the present embodiment, positioning of the first metal plate 1 and the second metal plate 2, and holding of the positioned state can be easily performed. The connection portion 54 of the first metal plate 1 and the second metal plate 2 is fixed by laser welding in the state in which the second metal plate 2 is temporarily fixed to the first metal plate 1 by the positioning holding mechanism 73. Consequently, according to the positioning holding mechanism 73 of the present embodiment, an angle between the first metal plate 1 and the second metal plate 2 can be prevented from deviating from a predetermined angle, and a relative position of the first metal plate 1 and the second metal plate 2 can be prevented from deviating from a predetermined position. According to the present embodiment, assembly of the frame body 31 of the image forming apparatus 30 can be facilitated.

Note that the engagement portion 80 may also be provided at the other end portion of the second metal plate 2, and the engagement portion 80 may be connected to a plurality of through-holes provided in the third metal plate 53 by the positioning holding mechanism 73. In the third metal plate 53, a plurality of through-holes that cause a fifth side and a sixth side that is a back side of the fifth side to communicate with each other are formed. In the other end portion of the second metal plate 2, a fourth protruding portion, a fifth protruding portion and a sixth protruding portion in sheet shapes are provided. In other words, the engagement portions 80 may be provided at both end portions of the second metal plate 2. The fourth protruding portion, the fifth protruding portion and the sixth protruding portion are integral with the body portion 2a of the second metal plate 2, protrude from the body portion 2a in the plane direction of the body portion 2a, and are inserted into the plurality of through-holes of the third metal plate 53 from a side of the fifth side of the third metal plate 53. The plurality of through-holes include a fourth through-hole, a fifth through-hole and a sixth through-hole. The fourth protruding portion is inserted into the fourth through-hole of the third metal plate 53. The fifth protruding portion is inserted into the fifth through-hole of the third metal plate 53, and the sixth protruding portion is inserted into the sixth through-hole of the third metal plate 53. In respective rims of the fifth through-hole and the sixth through-hole, a third end face that faces an end face of the fifth protruding portion in a direction orthogonal to an insertion direction and through-thickness direction of the second metal plate 2, and regulates movement of the second metal plate 2 in the orthogonal direction, a fourth end face that is at an opposite side to the third end face in the orthogonal direction, faces an end face of the sixth protruding portion in the orthogonal direction, and regulates movement of the second metal plate in the orthogonal direction, and other regulation portions that are for regulating movement of the second metal plate that is inserted into the fifth through-hole and the sixth through-hole of the third metal plate in the through-thickness direction of the second metal plate 2 and respectively face the third side and the fourth side of the fifth protruding portion and the sixth protruding portion are provided. The rim of the fourth through-hole of the third metal plate 53 is provided with another slope that elastically deforms the fourth protruding portion so that the fourth protruding portion rotates with the insertion direction of the fourth protruding portion as a rotation axis, in a state in which movement in the orthogonal direction and the through-thickness direction is regulated by the third end face, the fourth end face and the other regulation portions when the fourth protruding portion, the fifth protruding portion and the sixth protruding portion are inserted into the fourth through-hole, the fifth through-hole and the sixth through-hole of the third metal plate 53. The fourth protruding portion includes an engagement portion that engages with the sixth side of the third metal plate 53 so that a tip end side of the fourth protruding portion does not remove from the fourth through-hole in a state in which the fourth protruding portion rides over the other slope of the third metal plate 53 and elastic deformation is released. The second metal plate 2 is fixed to the first metal plate 1 and the third metal plate 53 by laser welding after connecting the first metal plate 1 and the third metal plate 53 by the positioning holding mechanism 73. In this way, according to the present embodiment, assembly of the frame body 31 of the image forming apparatus 30 can be facilitated.

According to the present embodiment, the second metal plate can be positioned to the first metal plate and held so that the second metal plate 2 does not easily remove from the first metal plate 1.

Further, the positioning holding mechanism 33 of Embodiment 1 is provided at one end portion of the second metal plate 2, and the positioning holding mechanism 73 of Embodiment 2 may be provided at the other end portion. After the second metal plate 2 is connected to the first metal plate 1 by the positioning holding mechanism 33, and is connected to the third metal plate 53 by the positioning holding mechanism 73, the second metal plate 2 is fixed to the first metal plate 1 and the third metal plate 53 by laser welding. In this case, assembly of the frame body 31 of the image forming apparatus 30 can be facilitated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A holding mechanism to be used in an image forming apparatus, the holding mechanism comprising:
   a first metal plate in which a through-hole which communicates a first side and a second side which is a back side of the first side is formed; and
   a second metal plate including a body portion, which is a metal plate having a third side and a fourth side which is a back side of the third side, a first protruding portion, a second protruding portion, and a third protruding portion, the first, second, and third protruding portions being in sheet shapes, formed integrally with the body portion, protruded from the body portion in a plane direction of the body portion, and inserted into the through-hole from a side of the first side of the first metal plate, wherein the first protruding portion protrudes from the body portion between the second protruding portion and the third protruding portion, wherein a rim of the through-hole comprises:
  a first end face which faces an end face of the second protruding portion in a direction orthogonal to an insertion direction and a through-thickness direction of the second metal plate, and regulates movement of the second metal plate in the orthogonal direction;
  a second end face which is at an opposite side to the first end face in the orthogonal direction, faces an end face of the third protruding portion in the orthogonal direction, and regulates movement of the second metal plate in the orthogonal direction;
  regulation portions which respectively face the third side and the fourth side of the second protruding portion and the third protruding portion in order to regulate movement of the second metal plate, which is inserted into the through-hole, in the through-thickness direction; and
  a slope which elastically deforms the first protruding portion so that the first protruding portion rotates with an insertion direction of the first protruding portion as a rotation axis in a state in which movement in the orthogonal direction and the through-thickness direction is regulated by the first end face, the second end face and the regulation portions when the first protruding portion, the second protruding portion and the third protruding portion are inserted into the through-hole, and wherein the first protruding portion includes an engagement portion which engages with the second side of the first metal plate in a state in which the first protruding portion rides over the slope and the elastic deformation is released.

2. The holding mechanism according to claim 1, wherein the first protruding portion is insertable into the through-hole in the insertion direction perpendicular to the first side of the first metal plate, and
  wherein the slope inclines in the orthogonal direction.

3. The holding mechanism according to claim 2, wherein the first protruding portion includes an abutment portion which abuts against the slope when the first protruding portion is inserted into the through-hole, and
  wherein the first protruding portion elastically deforms by being inserted in the insertion direction in a state in which the abutment portion and the slope are in point contact.

4. The holding mechanism according to claim 1, wherein the regulation portions include a plurality of protrusions which protrude from the rim of the through-hole toward an inside of the through-hole.

5. The holding mechanism according to claim 1, wherein the second protruding portion and the third protruding portion protrude more in the insertion direction than the first protruding portion with respect to the body portion.

6. The holding mechanism according to claim 1, wherein the second metal plate is provided with a butting portion which butts against the first side of the first metal plate in a state in which the first protruding portion, the second protruding portion and the third protruding portion are inserted into the through-hole, and
  wherein the first metal plate is held between the engagement portion and the butting portion.

7. The holding mechanism according to claim 1, wherein the first metal plate and the second metal plate are fixed by welding.

8. The holding mechanism according to claim 1, further comprising a third metal plate in which an other through-hole which communicates a fifth side and a sixth side which is a back side of the fifth side is formed,
  wherein the second metal plate further includes a fourth protruding portion, a fifth protruding portion and a sixth protruding portion, the fourth, fifth, and sixth protruding portions being in sheet shapes, formed integrally with the body portion, protruded from the body portion, in an opposite direction to a direction in which the first protruding portion, the second protruding portion, and the third protruding portion protrude from the body portion, in the plane direction of the body portion, and inserted into the other through-hole from a side of the fifth side of the third metal plate,
  wherein the fourth protruding portion protrudes from the body portion between the fifth protruding portion and the sixth protruding portion,
  wherein a rim of the other through-hole comprises:
    a third end face which faces an end face of the fifth protruding portion in the orthogonal direction of the second metal plate, and regulates movement of the second metal plate in the orthogonal direction;
    a fourth end face which is at an opposite side to the third end face in the orthogonal direction, faces an end face of the sixth protruding portion in the orthogonal direction, and regulates movement of the second metal plate in the orthogonal direction;
    other regulation portions which respectively face the third side and the fourth side of the fifth protruding portion and the sixth protruding portion in order to regulate movement of the second metal plate, which is inserted into to the other through-hole of the third metal plate, in the through-thickness direction of the second metal plate; and
    an other slope which elastically deforms the fourth protruding portion so that the fourth protruding portion rotates with an insertion direction of the fourth protruding portion as a rotation axis in a state in which movement in the orthogonal direction and the through-thickness direction is regulated by the third end face, the fourth end face and the other regulation portions when the fourth protruding portion, the fifth protruding portion and the sixth protruding portion are inserted into the other through-hole of the third metal plate, and
  wherein the fourth protruding portion includes an engagement portion which engages with the sixth side of the third metal plate in a state in which the fourth protruding portion rides over the other slope of the third metal plate and the elastic deformation is released.

9. The holding mechanism according to claim 8, wherein the second metal plate and the third metal plate are fixed by welding.

10. An image forming apparatus comprising:
  a holding mechanism comprising:
    a first metal plate in which a through-hole which communicates a first side and a second side which is a back side of the first side is formed; and
    a second metal plate including a body portion, which is a metal plate having a third side and a fourth side which is a back side of the third side, a first protruding portion, a second protruding portion, and a third protruding portion, the first, second, and third protruding portions being in sheet shapes, formed integrally with the body portion, protruded from the body portion in a plane direction of the body portion, and inserted into the through-hole from a side of the first side of the first metal plate, wherein the first protruding portion protrudes from the body portion between the second protruding portion and the third protruding portion, wherein a rim of the through-hole comprises:
 a first end face which faces an end face of the second protruding portion in a direction orthogonal to an insertion direction and a through-thickness direction of the second metal plate, and regulates movement of the second metal plate in the orthogonal direction;
 a second end face which is at an opposite side to the first end face in the orthogonal direction, faces an end face of the third protruding portion in the orthogonal direction, and regulates movement of the second metal plate in the orthogonal direction;
 regulation portions which respectively face the third side and the fourth side of the second protruding portion and the third protruding portion in order to regulate movement of the second metal plate, which is inserted into the through-hole, in the through-thickness direction; and
 a slope which elastically deforms the first protruding portion so that the first protruding portion rotates with an insertion direction of the first protruding portion as a rotation axis in a state in which movement in the orthogonal direction and the through-thickness direction is regulated by the first end face, the second end face and the regulation portions when the first protruding portion, the second protruding portion and the third protruding portion are inserted into the through-hole, and wherein the first protruding portion includes an engagement portion which engages with the second side of the first metal plate in a state in which the first protruding portion rides over the slope and the elastic deformation is released; and an image forming portion that is held by the holding mechanism, and forms an image on a recording medium.

11. A holding mechanism to be used in an image forming apparatus, the holding mechanism comprising:
 a first metal plate in which a first through-hole, a second through-hole and a third through-hole which communicate a first side and a second side which is a back side of the first side are formed; and
 a second metal plate including a body portion, which is a metal plate having a third side and a fourth side which is a back side of the third side, a first protruding portion, a second protruding portion, and a third protruding portion, the first, second, and third protruding portions being in sheet shapes, formed integrally with the body portion, protruded from the body portion in a plane direction of the body portion, and respectively inserted into the first through-hole, the second through-hole and the third through-hole from a side of the first side of the first metal plate, wherein the first protruding portion protrudes from the body portion between the second protruding portion and the third protruding portion, wherein a rim of either one of the second through-hole and the third through-hole comprises:
 a first end face which faces an end face of either one of the second protruding portion and the third protruding portion in a direction orthogonal to an insertion direction and a through-thickness direction of the second metal plate, and regulates movement of the second metal plate in the orthogonal direction;
 a second end face which faces an other end face at an opposite side to the first end face in the orthogonal direction of either one of the second protruding portion and the third protruding portion, and regulates movement of the second metal plate in the orthogonal direction; and
 regulation portions which respectively face the third side and the fourth side of either one of the second protruding portion and the third protruding portion in the through-thickness direction in order to regulate movement of the second metal plate in the through-thickness direction, wherein a rim of the first through-hole comprises a slope which elastically deforms the first protruding portion so that the first protruding portion rotates with an insertion direction of the first protruding portion as a rotation axis in a state in which movement in the orthogonal direction and the through-thickness direction is regulated by the first end face, the second end face and the regulation portions when the first protruding portion is inserted, and wherein the first protruding portion includes an engagement portion which engages with the second side of the first metal plate in a state in which the first protruding portion rides over the slope and the elastic deformation is released.

12. The holding mechanism according to claim 11, wherein the first protruding portion is insertable into the first through-hole in the insertion direction perpendicular to the first side of the first metal plate, and
 wherein the slope inclines in the orthogonal direction.

13. The holding mechanism according to claim 12, wherein the first protruding portion includes an abutment portion which abuts against the slope when the first protruding portion is inserted into the first through-hole, and
 wherein the first protruding portion elastically deforms by being inserted in the insertion direction in a state in which the abutment portion and the slope are in point contact.

14. The holding mechanism according to claim 11, wherein the regulation portions of the first through-hole include a plurality of protrusions which protrude from the rim of the first through-hole toward an inside of the first through-hole, and
 wherein the regulation portions of the second through-hole include a plurality of protrusions which protrude from the rim of the second through-hole toward an inside of the second through-hole.

15. The holding mechanism according to claim 11, wherein the second protruding portion and the third protruding portion protrude more in the insertion direction than the first protruding portion with respect to the body portion.

16. The holding mechanism according to claim 11, wherein the second metal plate is provided with a butting portion which butts against the first side of the first metal plate in a state in which the first protruding portion, the second protruding portion and the third protruding portion are respectively inserted into the first through-hole, the second through-hole, and the third through-hole, and
 wherein the first metal plate is held between the engagement portion and the butting portion.

17. The holding mechanism according to claim 11, wherein the first metal plate and the second metal plate are fixed by welding.

18. The holding mechanism according to claim 11, further comprising a third metal plate in which a fourth through-hole, a fifth through-hole and a sixth through-hole which communicate a fifth side and a sixth side which is a back side of the fifth side are formed,
  wherein the second metal plate further includes a fourth protruding portion, a fifth protruding portion and a sixth protruding portion, the fourth, fifth, and sixth protruding portion being in sheet shapes, formed integrally with the body portion, protruded from the body portion, in an opposite direction to a direction in which the first protruding portion, the second protruding portion, and the third protruding portion protrude from the body portion, in the plane direction of the body portion, and respectively inserted into the fourth through-hole, the fifth through-hole, and the sixth through-hole from a side of the fifth side of the third metal plate,
  wherein the fourth protruding portion protrudes from the body portion between the fifth protruding portion and the sixth protruding portion,
  wherein a rim of each of the fifth through-hole and the sixth through-hole comprises:
    a third end face which faces an end face of the fifth protruding portion in the orthogonal direction of the second metal plate, and regulates movement of the second metal plate in the orthogonal direction;
    a fourth end face which is at an opposite side to the third end face in the orthogonal direction, faces an end face of the sixth protruding portion in the orthogonal direction, and regulates movement of the second metal plate in the orthogonal direction; and
    other regulation portions which respectively face the third side and the fourth side of the fifth protruding portion and the sixth protruding portion in order to regulate movement of the second metal plate, which is inserted into the fifth through-hole and the sixth through-hole of the third metal plate, in the through-thickness direction of the second metal plate, and,
  wherein a rim of the fourth through-hole of the third metal plate comprises an other slope which elastically deforms the fourth protruding portion so that the fourth protruding portion rotates with an insertion direction of the fourth protruding portion as a rotation axis in a state in which movement in the orthogonal direction and the through-thickness direction is regulated by the third end face, the fourth end face and the other regulation portions when the fourth protruding portion, the fifth protruding portion, and the sixth protruding portion are inserted into the fourth through-hole, the fifth through-hole, and the sixth through-hole of the third metal plate, and
  wherein the fourth protruding portion includes an engagement portion which engages with the sixth side of the third metal plate in a state in which the fourth protruding portion rides over the other slope of the third metal plate and the elastic deformation is released.

19. The holding mechanism according to claim 18, wherein the second metal plate and the third metal plate are fixed by welding.

20. An image forming apparatus comprising:
  a holding mechanism comprising:
    a first metal plate in which a first through-hole, a second through-hole and a third through-hole which communicate a first side and a second side which is a back side of the first side are formed; and
    a second metal plate including a body portion, which is a metal plate having a third side and a fourth side which is a back side of the third side, a first protruding portion, a second protruding portion, and a third protruding portion, the first, second, and third protruding portions being in sheet shapes, formed integrally with the body portion, protruded from the body portion in a plane direction of the body portion, and respectively inserted into the first through-hole, the second through-hole and the third through-hole from a side of the first side of the first metal plate,
    wherein the first protruding portion protrudes from the body portion between the second protruding portion and the third protruding portion,
    wherein a rim of either one of the second through-hole and the third through-hole comprises:
      a first end face which faces an end face of either one of the second protruding portion and the third protruding portion in a direction orthogonal to an insertion direction and a through-thickness direction of the second metal plate, and regulates movement of the second metal plate in the orthogonal direction;
      a second end face which faces an other end face at an opposite side to the first end face in the orthogonal direction of either one of the second protruding portion and the third protruding portion, and regulates movement of the second metal plate in the orthogonal direction; and
      regulation portions which respectively face the third side and the fourth side of either one of the second protruding portion and the third protruding portion in the through-thickness direction in order to regulate movement of the second metal plate in the through-thickness direction,
    wherein a rim of the first through-hole comprises a slope which elastically deforms the first protruding portion so that the first protruding portion rotates with an insertion direction of the first protruding portion as a rotation axis in a state in which movement in the orthogonal direction and the through-thickness direction is regulated by the first end face, the second end face and the regulation portions when the first protruding portion is inserted, and
    wherein the first protruding portion includes an engagement portion which engages with the second side of the first metal plate in a state in which the first protruding portion rides over the slope and the elastic deformation is released; and
  an image forming portion which is held by the holding mechanism, and forms an image on a recording medium.

* * * * *